(12) United States Patent
Spriggins et al.

(10) Patent No.: US 11,788,693 B2
(45) Date of Patent: Oct. 17, 2023

(54) PERSONAL MOBILITY ASSISTANCE DEVICES WITH LIGHT SETS AND LIGHT SET KITS

(71) Applicants: Leo A. Spriggins, Lucas, TX (US); Charles D. Gavrilovich, Jr., Chula Vista, CA (US)

(72) Inventors: Leo A. Spriggins, Lucas, TX (US); Charles D. Gavrilovich, Jr., Chula Vista, CA (US)

(73) Assignee: BeDazzleit LLC, Lucas, TX (US)

( * ) Notice: Subject to any disclaimer, the term of this patent is extended or adjusted under 35 U.S.C. 154(b) by 0 days.

(21) Appl. No.: 16/261,938

(22) Filed: Jan. 30, 2019

(65) Prior Publication Data

US 2019/0195443 A1    Jun. 27, 2019

Related U.S. Application Data

(63) Continuation of application No. 15/634,948, filed on Jun. 27, 2017, now Pat. No. 10,234,087.

(60) Provisional application No. 62/357,551, filed on Jul. 1, 2016.

(51) Int. Cl.
| | |
|---|---|
| *F21S 4/10* | (2016.01) |
| *F21V 23/00* | (2015.01) |
| *F21S 9/02* | (2006.01) |
| *F21V 19/00* | (2006.01) |
| *A61G 15/00* | (2006.01) |
| *B62B 9/00* | (2006.01) |
| *F21Y 115/10* | (2016.01) |

(52) U.S. Cl.
CPC .............. *F21S 4/10* (2016.01); *A61G 15/002* (2013.01); *B62B 9/005* (2013.01); *F21S 9/02* (2013.01); *F21V 19/0025* (2013.01); *F21V 23/001* (2013.01); *A61G 2203/70* (2013.01); *F21Y 2115/10* (2016.08)

(58) Field of Classification Search
CPC .. F21S 4/10; F21S 9/02; F21V 23/001; F21V 19/0025; A61G 15/002; B62B 9/005
USPC ....................................... 362/234; 280/47.38
See application file for complete search history.

(56) References Cited

U.S. PATENT DOCUMENTS

| | | | | |
|---|---|---|---|---|
| 4,774,642 A * | 9/1988 | Janko | ................... | A41D 27/085 362/108 |
| 5,008,782 A * | 4/1991 | Murray | ................... | B62J 6/029 74/551.8 |
| 8,356,824 B1 * | 1/2013 | Manweiler | .............. | B62B 9/005 280/33.992 |
| 8,360,608 B2 * | 1/2013 | Wildner | .................... | F21S 4/20 362/249.04 |
| 8,556,484 B2 * | 10/2013 | Ho | ........................ | G02B 6/0096 362/551 |
| 8,899,799 B1 * | 12/2014 | Fairhurst | ................. | B62B 9/005 362/459 |

(Continued)

*Primary Examiner* — Christle I Marshall
(74) *Attorney, Agent, or Firm* — Gavrilovich, Dodd & Lindsey, LLP; Charles D. Gavrilovich, Jr.

(57) ABSTRACT

A personal mobility assistance device includes lights that accent the shape of the device. The lights include a battery, a wire, and a plurality of light emitting devices connected to the wire and powered by the battery. The light emitting devices are spaced sufficiently close to each other along the wire such that, when the vehicle is observed in low light conditions, the shape of the personal mobility assistance device is discernable to the observer.

13 Claims, 24 Drawing Sheets

(56) References Cited

U.S. PATENT DOCUMENTS

| | | | | |
|---|---|---|---|---|
| 8,985,802 B2* | 3/2015 | Nievas | ................... | A45B 3/02 |
| | | | | 362/184 |
| 2002/0055798 A1* | 5/2002 | Haye | ................... | G06Q 10/00 |
| | | | | 700/95 |
| 2010/0301645 A1* | 12/2010 | Uwnawich | ........... | B60N 2/2863 |
| | | | | 297/183.6 |
| 2012/0155097 A1* | 6/2012 | Gross | ................... | B62B 9/005 |
| | | | | 280/47.38 |
| 2016/0009219 A1* | 1/2016 | Gilbert | ................ | B62B 9/005 |
| | | | | 280/47.38 |
| 2017/0292285 A1* | 10/2017 | Jin | ....................... | E04H 15/60 |

* cited by examiner

PERSONAL MOBILITY ASSISTANCE DEVICES WITH LIGHT SETS AND LIGHT SET KITS

RELATED APPLICATIONS

This is a continuation of U.S. application Ser. No. 15/634,948 filed on Jun. 27, 2017, entitled "PERSONAL MOBILITY ASSISTANCE DEVICES WITH LIGHT SETS AND METHODS", now U.S. Pat. No. 10,234,087, which claims priority to Provisional Application Ser. No. 62/357,551, filed on Jul. 1, 2016, which are both incorporated by reference in their entirety, herein.

FIELD

This invention generally relates to light sets and more particularly to light sets and light set kits for personal mobility assistance devices.

BACKGROUND

Personal mobility assistance devices are used to assist in moving people and pets. Personal mobility assistance devices include personal wheeled mobility assistance vehicles and personal non-wheeled mobility assistance devices. Examples of personal wheeled mobility assistance vehicles include baby strollers, child strollers, jogging strollers, wheel chairs, knee scooters, and pet strollers. Examples of personal non-wheeled mobility assistance devices include walkers, crutches and canes.

SUMMARY

A personal mobility assistance device includes lights that accent the shape of the device. The lights include a battery, a wire, and a plurality of light emitting devices connected to the wire and powered by the battery. The light emitting devices are spaced sufficiently close to each other along the wire such that, when the personal mobility assistance device is observed in low light conditions, the shape of the vehicle is discernable to the observer.

DETAILED DESCRIPTION

Figure 1A:
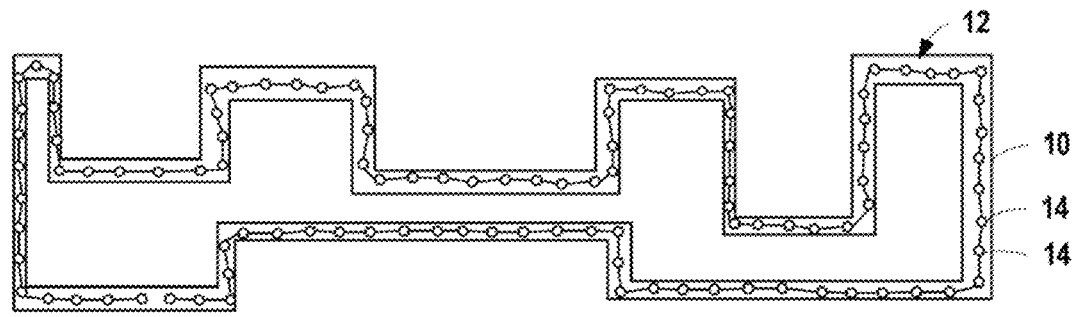
FIG. 1A is a block diagram of a generic example of a personal mobility assistance device with a light set.
Figure 1B:
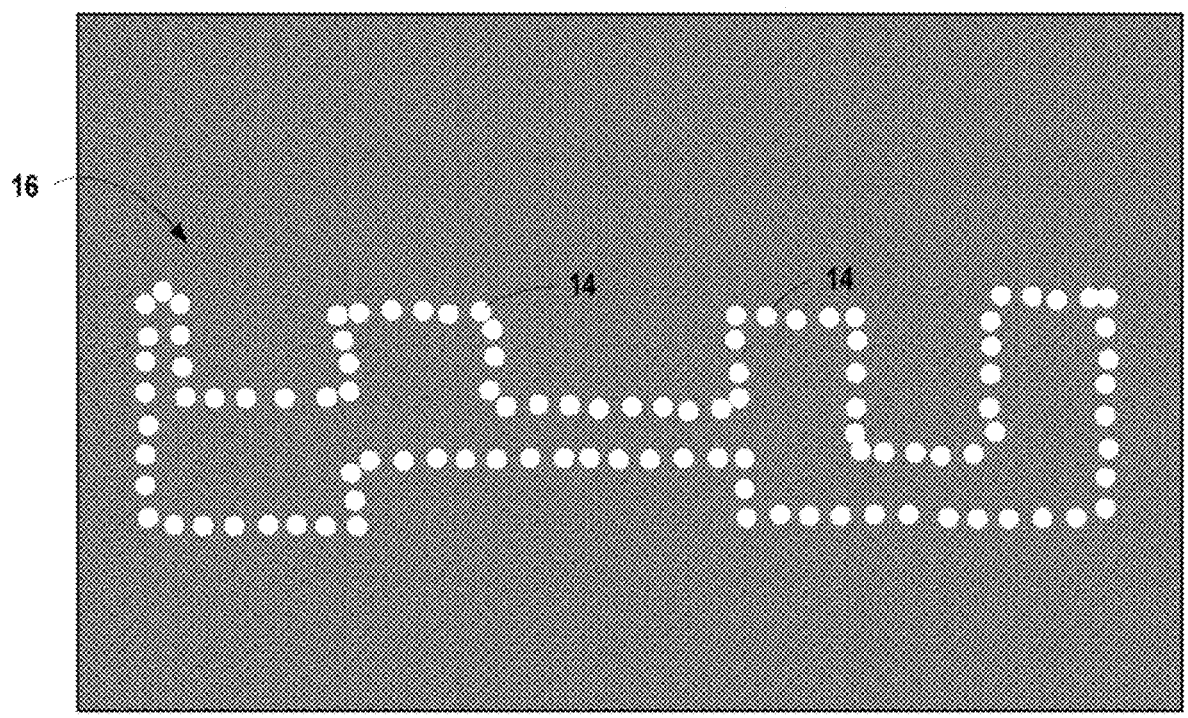
FIG. 1B is an illustration of the exemplary personal mobility assistance device in low light conditions.

FIG. 1A is a block diagram of generic example of a personal mobility assistance device 10 with a light set 12. FIG. 1B is an illustration of the exemplary personal mobility assistance device 10 in a low light condition. FIG. 1A and FIG. 1B do not represent any particular personal mobility assistance device 10 and are only intended to generically illustrate some concepts of the embodiments discussed below. In accordance with techniques discussed herein, a light set 12 is attached to a personal mobility assistance device (mobility device) 10 such as a child stroller, baby stroller, jogging stroller, wheel chair, knee scooter, pet stroller, walker, cane, or crutch. The light set 12 is attached in such a way that, in low light conditions, an observer of the light emitters 14 of the light set 12 perceives at least some of the shape of the personal mobility assistance device. The spacing between the light emitters 14 is sufficiently small to allow the observer to interpret the shape of the mobility device 10. In some examples, the light set 12 is attached to the frame of the mobility device. In addition, the light set may be attached to other features of the mobility device to further outline the shape of the mobility device 10. For example, the light set 12 may be attached to a seat to highlight the seat. In some situations, a light set 12 may be attached to a wheel. FIG. 1B shows that the shape of mobility device 10 can, at least partially, be determined by the illumination pattern 16 of the light emitters.

The personal mobility assistance device 10 may be a wheeled personal mobility assistance device (wheeled mobility device) or a non-wheeled personal mobility assistance device (non-wheeled mobility device). Accordingly, as used herein, a personal mobility assistance device 10, mobility assistance device 10, mobility device 10, and device 10 broadly and collectively refer to wheeled mobility assistance devices and non-wheeled mobility assistance devices. Examples of wheeled mobility devices include child strollers, baby strollers, jogging strollers, wheel chairs, knee scooters, pet strollers, and standing wheel chairs. Examples of non-wheeled mobility devices include walkers, crutches, and canes.

In some situations, a mobility assistance device 10 may be moved by something other than human power. For example, electric motors can be used to propel, or assist in propelling, devices such as scooters, wheel chairs, strollers, and other wheeled mobility devices. The examples discussed below focus on human propelled devices. The techniques and light sets discussed herein, however, may be applied to mobility devices that are driven, powered or otherwise moved by something other than human power. Such devices are referred to as powered personal mobility assistance devices, powered wheeled devices, powered devices, and other similar terms.

Figure 1C:
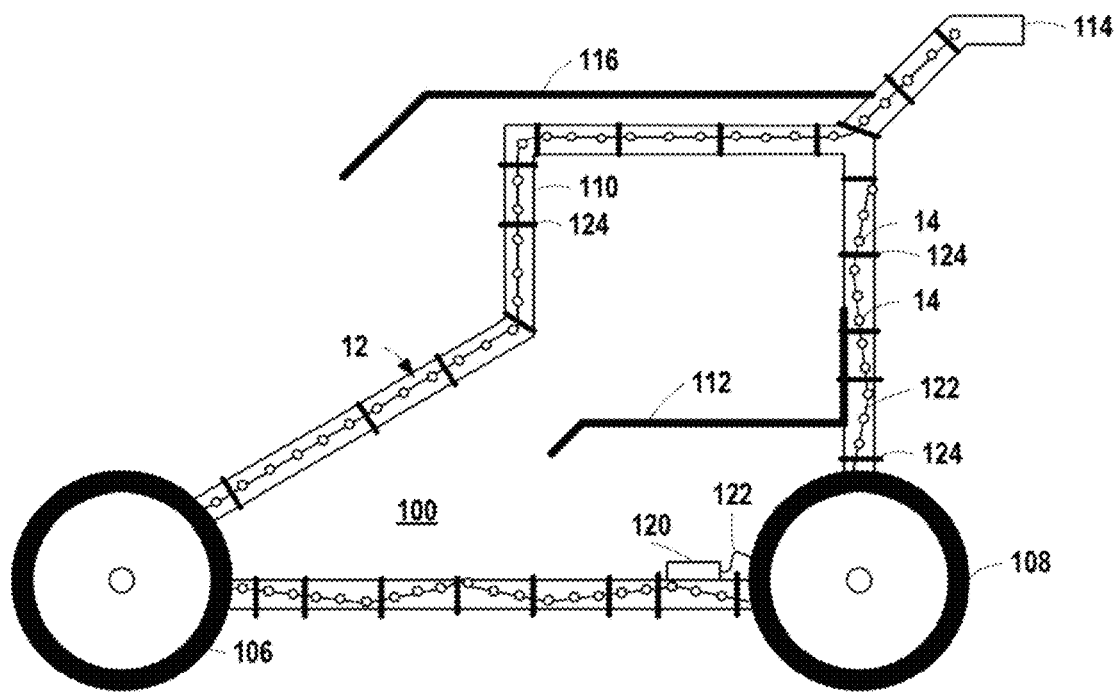
FIG. 1C is an illustration of a generic example of a wheeled personal mobility assistance device with a light set.
Figure 1D:
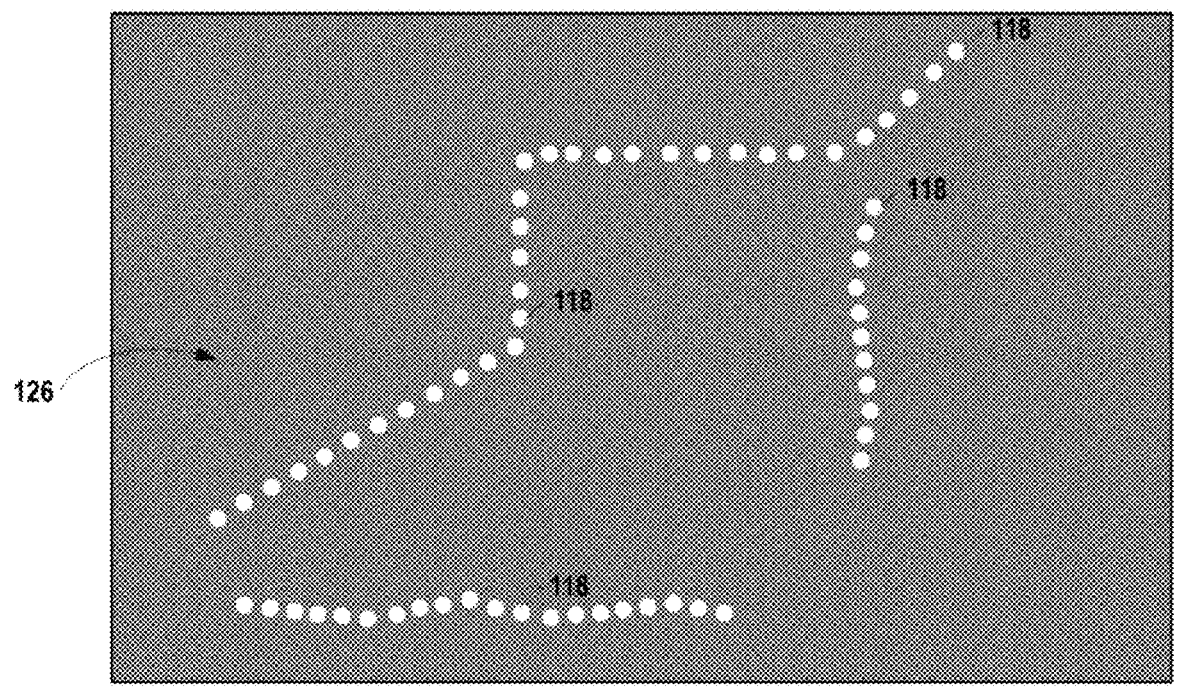
FIG. 1D is an illustration of an example where the wheeled personal mobility assistance device is observed in low light conditions.

FIG. 1C is an illustration of a generic example of a wheeled mobility assistance vehicle 100 with a light set 12. FIG. 1D is an illustration of an example where the vehicle 100 is observed in low light conditions. Therefore, FIG. 1C and FIG. 1D are illustrations of an example where the mobility device 10 is a wheeled mobility device 100, which is also referred to as a wheeled mobility assistance vehicle 100. As discussed herein, the wheeled mobility assistance vehicle 100 is any cart, stroller, or wheelchair used for moving an adult, child or pet. As discussed above, examples of wheeled mobility assistance vehicles 100 include child strollers, baby strollers, jogging strollers, pet strollers, knee scooters, medical scooters, and wheel chairs. For the examples herein, the wheeled mobility assistance vehicle 100 includes at least a plurality of wheels 106, 108 and a frame 110. In most situations, the vehicle 100 also includes a passenger support mechanism 112 such as a sling, seat, chair or harness. The vehicle may also include one or more handles 114 that allow a person to push the vehicle 100. Depending on the particular type of vehicle, the vehicle may also include a canopy or shade mechanism 116 and other features. The illustration of FIG. 1C is a generic representation of a vehicle illustrating the components of the vehicle 100 and does not necessarily show a particular vehicle.

In accordance with the examples herein, the light set 12 is attached to the frame of the vehicle 100. As discussed below in further detail, the light set 12 includes at least a plurality of light emitters 14, a power source 120 and a flexible conductor 122 connecting the light emitters 14 to the power source. Although other techniques may be used in some circumstances, the light set 12 is attached to the frame using flexible mechanical fasteners 124. In one example, the mechanical fasteners 124 are plastic cable ties. The light set 12 is attached to the vehicle in such a way that, during appropriate light conditions, the light emitters 14 outline features of the vehicle to allow an observer to recognize at least a general shape 126 of the vehicle. For the examples discussed herein, therefore, the light set 12 is at least attached to the frame of the vehicle 100. The light emitters 14 radiate light and are sufficiently close to each other such that the shape of the vehicle 100 can be recognized or otherwise observed. Although components of the vehicle 100 are not shown in FIG. 1D, at least portions of some components may be visible in some lighting conditions.

Depending on the particular device 10, light set design, and situation, the light set 12 may provide one or more advantages or desirable features. In some circumstances, the light set 12 may be for decorative purposes and may provide a visually pleasing illumination display. The colors and positions of the light emitters 14 may be selected to present a particular desired appearance. For example, the light set 12 design may capture holidays, sport team colors, country colors, event logos (e.g., Olympics), and movie, theme park, and cartoon characters (e.g., Disney® and Star Wars characters). In some situations, the light set 12 allows for increased safety due to increased visibility of the mobility device 12 in low light conditions. The light set 12, for example, may increase the visibility of wheeled mobility devices on sidewalks or crosswalks thereby decreasing the chances for an accident. In addition, the light set 12 may allow the mobility device 10 to be easily recognizable in crowds. For example, a child stroller with the light set 12 may be easily recognizable at a large distance in the dark or in low light conditions. Such a feature may be particularly useful at night in a crowded area such as a theme park where parents are separated but can easily detect and identify their child's stroller in the midst of multiple strollers and people. In most situations, the light set simultaneously provides multiple advantages.

Figure 2A:
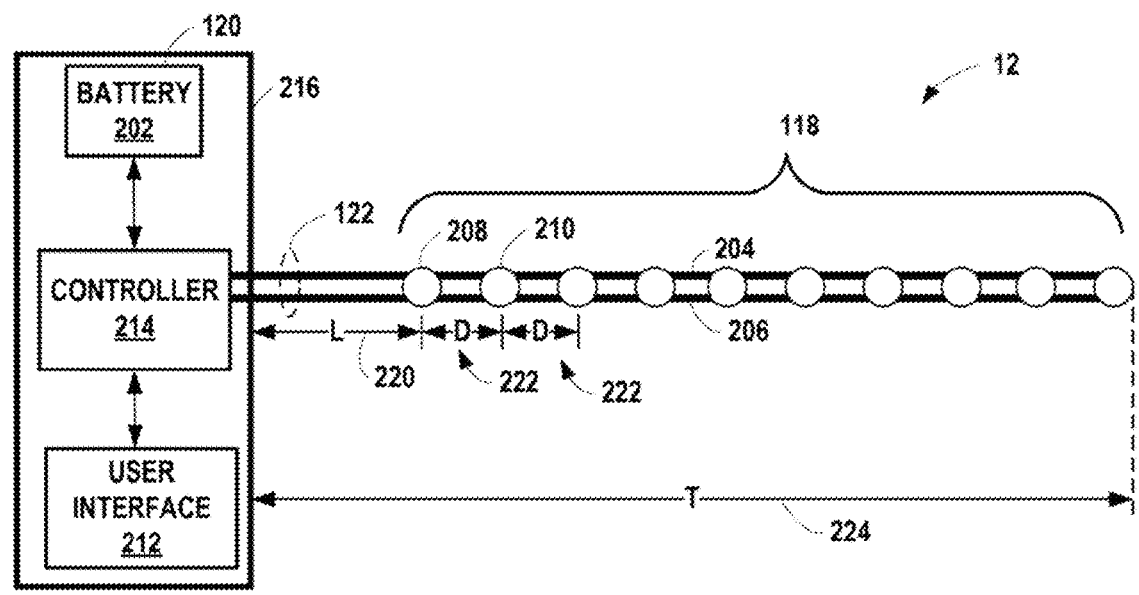
FIG. 2A is a block diagram of an example of a light set.

FIG. 2A is a block diagram of an example of a light set 12. For the example, the light set 12 includes a power source 120 such as battery 202, a flexible conductor 122, such as a flexible wire system including a first wire 204 and second wire 206, and a plurality of light emitters (14) 208, 210 such as light emitting diodes (LEDs) or light bulbs. In some circumstances, the light set 12 also includes a user interface 212 and controller 214 although either or both can be omitted. The controller 214 and user interface 212 may form a simple on/off switch in some circumstances. The controller 214, may control power to the light emitters 14 in order to facilitate flashing and/or to set the color of the light emitters 14. For example, the controller 214 may turn on and turn off the light emitters such that the light emitters flash on and off. The duty cycle of the flashing may be changed by the controller 214 to obtain a desired pattern of flashing. The current and/or voltage provided to the light emitters 14 when the light emitters 14 are "on" may be adjusted by the controller 214 to obtain a desired color of the light emitters. For example, where the light emitters are LEDs, color of the emitted light may be manipulated by setting the DC current and/or DC voltage provided to the LEDs. Also, the color may be adjusted by setting a duty cycle and/or waveform of a varying power supply to the LEDs. In addition to other electrical components, the controller 214 may include a microprocessor, processor, or other logical components that are configured to perform the discussed control functions. The user interface 212 is any mechanism that allows a user to input information or make selections and may be implemented as one or more buttons connected to the controller 214. As discussed above, the user interface 212 and controller 214 may form a switch that electrically connects and disconnects the battery from the flexible conductor. In some situations, the light set 12 may include an additional switch that is used to connect and disconnect the battery from the conductor or the controller 214.

Although in most situations all the light emitters of the light set are the same type, color, and size, the light emitters on a single light set may differ. For example, different color light emitters may be used on a single light set.

For the examples herein, the flexible conductor 122 is sufficiently flexible to allow the light set to be routed along the contours of a mobility assistance device without kinking or breaking. Some applications require the conductor to be bent at significant angles. In some situations, the flexible conductor 122 may need to be folded in a 180 degree bend. Since some mobility assistance devices may be adjustable, foldable, or otherwise reconfigurable, the flexible conductor is also configured to withstand repeated bending without kinking or breaking. For example, where the light set is routed along a stroller through a linkage mechanism, joint or "break point" used for collapsing the stroller, repeated collapsing and expanding of the stroller will result in repeated bending of the flexible conductor at the break point that should not result in any undesired deterioration of the conductor or insulation.

The flexible conductor 122 may include more than two conductors (e.g., wires) in some situations. For example, where the plurality of light emitters includes multiple sets of light emitters to be controlled independently, an additional conductor may be needed for each set of light emitters.

For the example of FIG. 2A, the battery 202 and the controller 214 are enclosed in a housing 216. The housing 216 is preferably plastic although other materials may be used in some situations. The flexible conductor 122 connects to circuitry inside the housing and extends through an opening in the housing 216. For the examples herein, the flexible conductor 122 has a lead portion 218 that extends from the housing 216 to the first light emitter 208. The length 220 of the lead portion 218 is typically longer than a distance (spacing) 222 between the light emitters 208, 210 (218). An example of a suitable length 220 of the lead portion 218 is one foot. As explained above, the spacing (D) 222 between the light emitters is sufficiently small to facilitate sufficiently highlighting the features of the mobility device. Although various spacing can be used, the spacing 222 should be less than six inches and greater than one half inch. In some situations, the spacing 222 is less than five inches. In other situations, the spacing 222 is less than four inches. In still other circumstances, the spacing 222 is less than three inches. A preferred spacing 222 is between 1.5 and 2.5 inches. For the examples herein, the spacing 222 is approximately two inches although spacing of less than two inches may be used. For some examples herein, the spacing 222 between adjacent light emitters is the same although different spacing can be used in some situations. As discussed below, for example, where a light set 12 is designed for a particular mobility assistance device, the spacing between each light emitter may be selected in accordance with the features of the device such that each light emitter is positioned at a preferred location on the mobility assistance device.

In one example, the number of light emitters 14 of a light set 12 and length 224 of the light set 12 is sufficient to allow highlighting of at least a portion of the mobility assistance device such that the starting and end points of the light set 12 occur at transition areas of the features of the mobility assistance device. In other words, the light set length 224 should allow the light set 12 to be attached to the mobility assistance device 10 in such a way that the housing 216 and the end of the light strand are not located along a device feature. As discussed below, a method of applying the light set 12 to the mobility assistance device 10 includes placing the housing 120 in an inconspicuous location on the mobility assistance device 10 such as a floor area of a stroller. An example of a suitable length 224 is 11 feet although a length between 2 feet and 20 feet may be used. Therefore, other examples of lengths that can be used include lengths of 3, 4, 5, 6, 7, 8, 9, 10, 12, 13, 14, 15, 16, 17, 18, and 19 feet as well as lengths between any of these lengths.

Figure 2B:
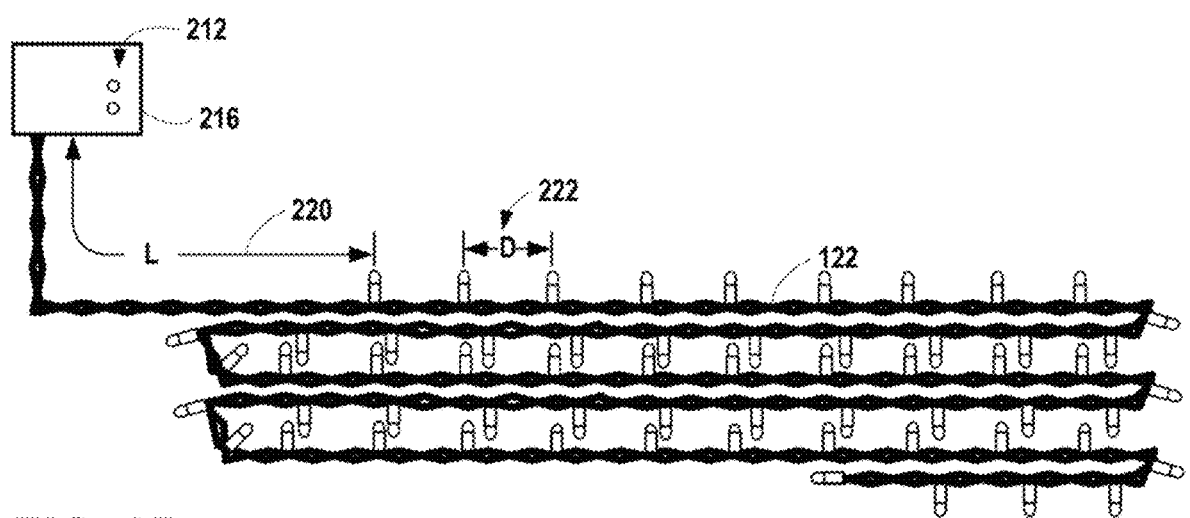
FIG. 2B is an illustration of an example of a light set having 60 light emitters.

FIG. 2B is an illustration of an example of a light set 12 having 60 light emitters 14. The number of light emitters 14 depends on the light emitters spacing 222, light set length 224, and lead length 220. An example of a suitable number of light emitters is 60. Therefore, for one example, the light set is 11.0 feet long, has a lead length of 1.0 foot, and includes 60 light emitters with a light emitter spacing of 2.0 inches. Although the illustration of FIG. 2B depicts an example of a light set having these characteristics, it is not necessarily to scale.

Figure 3A:
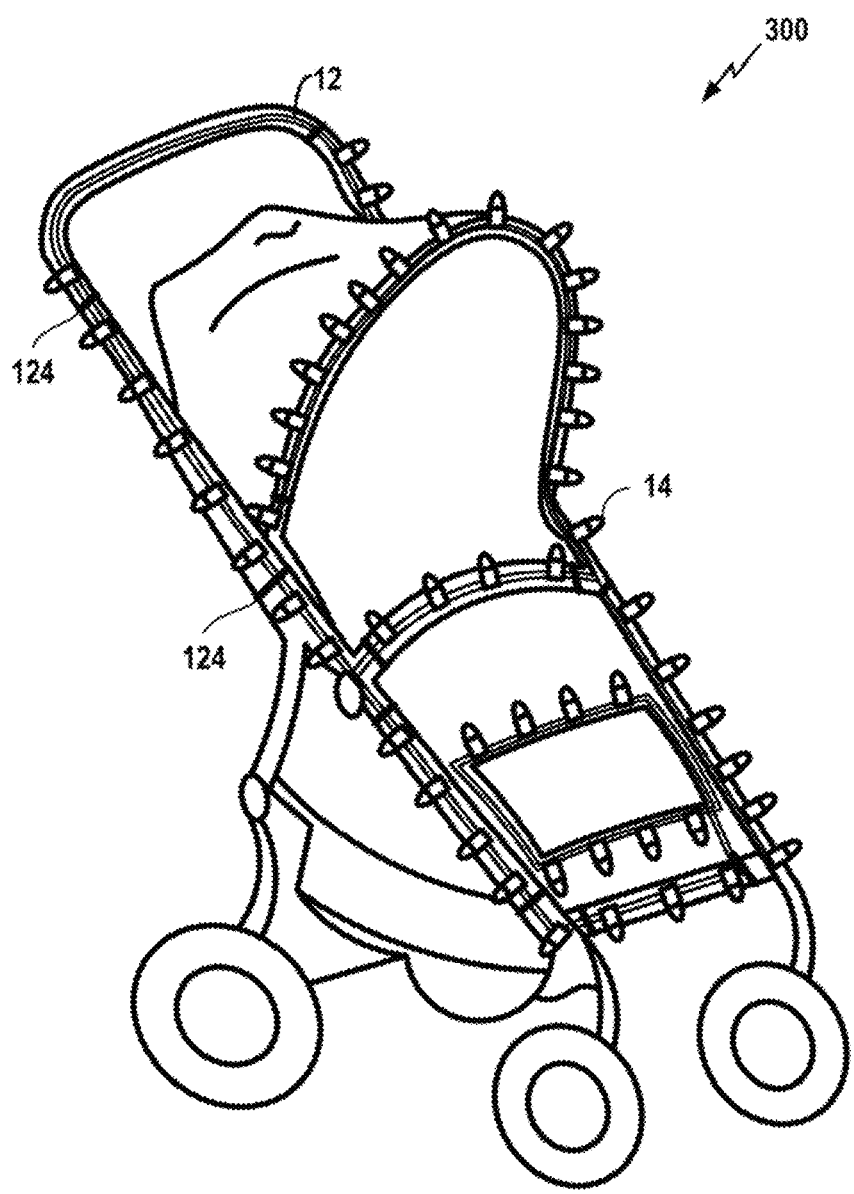
FIG. 3A is an illustration of a perspective view of the personal mobility assistance device for an example where the device is a child stroller with the light set.
Figure 3B:
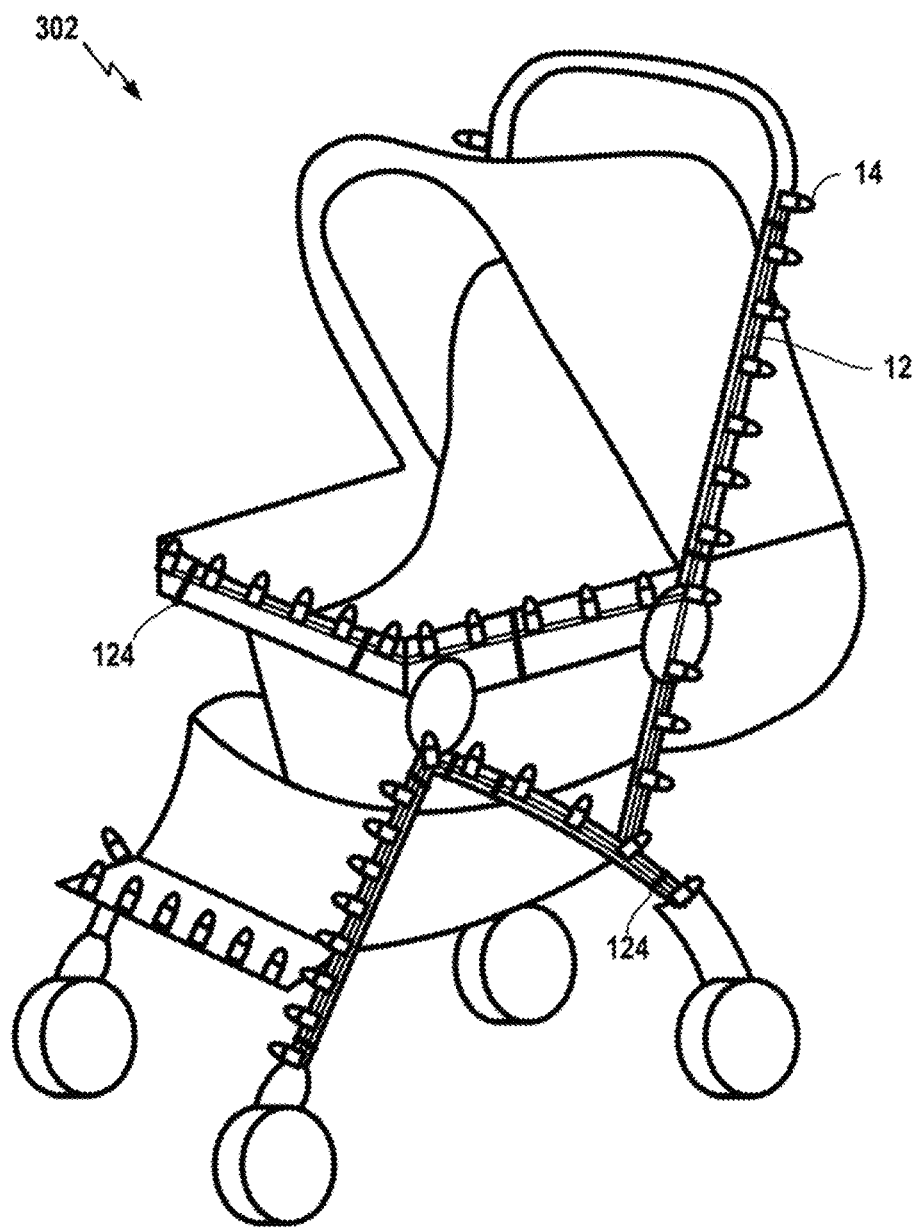
FIG. 3B is an illustration of a perspective view of the personal mobility assistance device for an example where the device is a baby stroller with the light set.
Figure 3C:
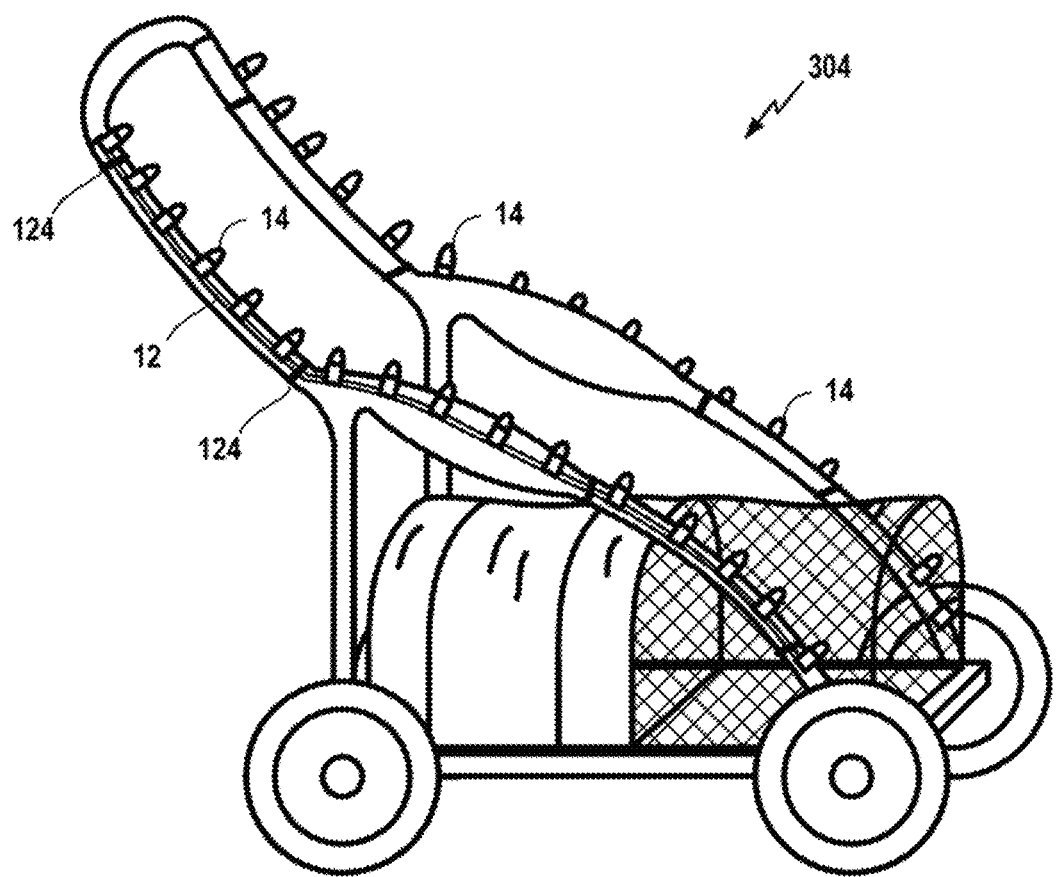
FIG. 3C is an illustration of a perspective view of the personal mobility assistance device for an example where the wheeled personal mobility assistance device is a pet stroller with the light set.
Figure 3D:
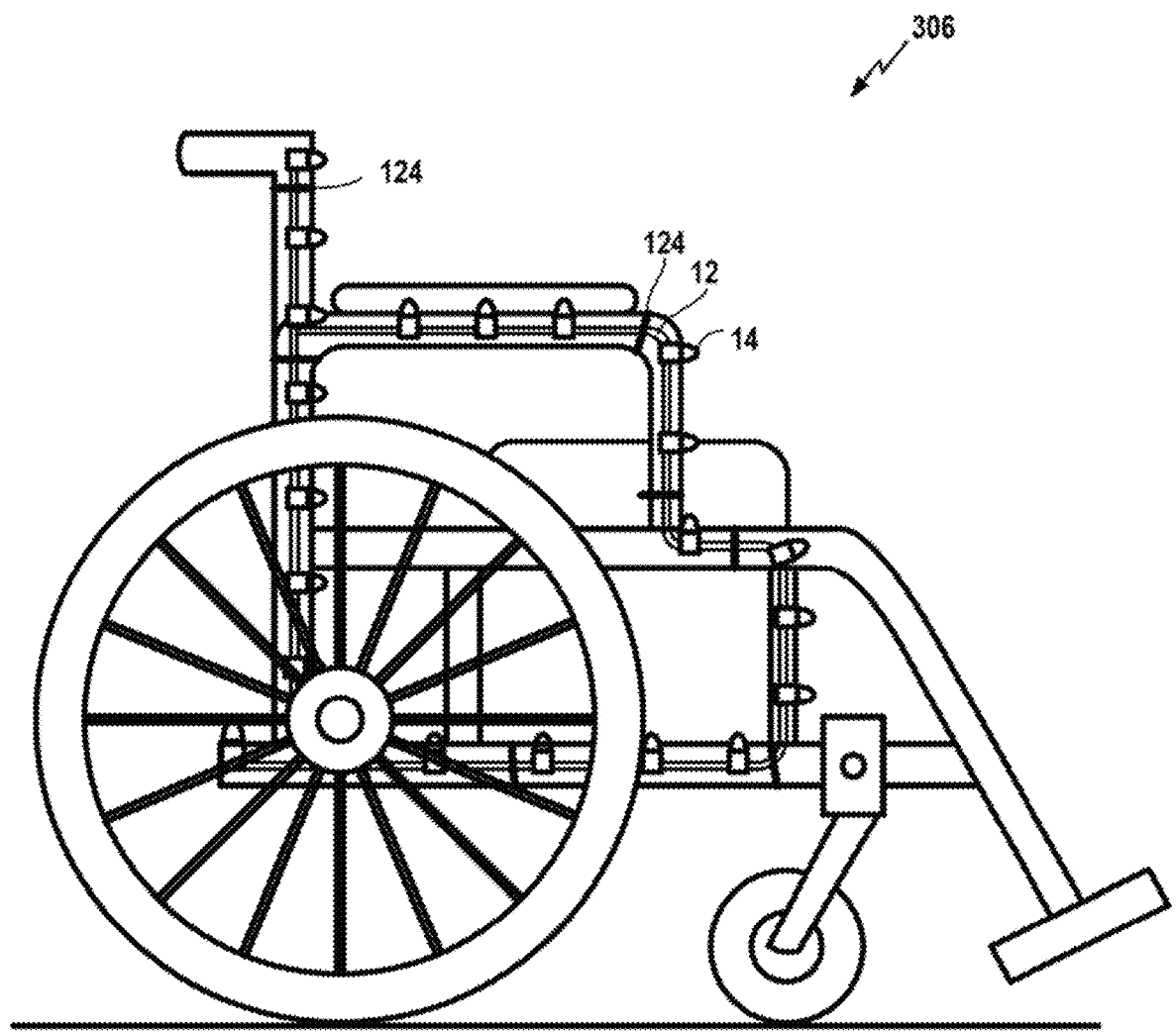
FIG. 3D is an illustration of a side view of the personal mobility assistance device for an example where the wheeled personal mobility assistance device is a wheel chair with the light set.
Figure 3E:
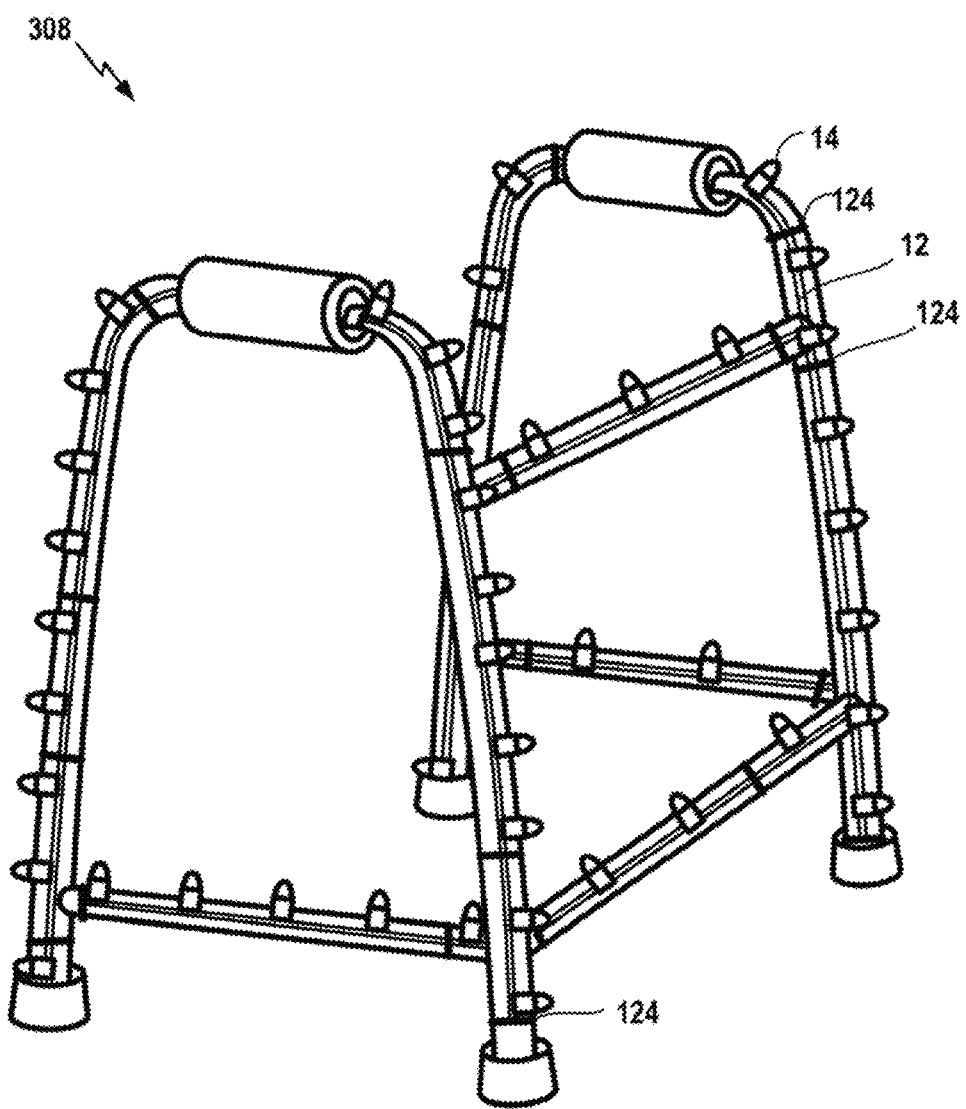
FIG. 3E is an illustration of a perspective view of the personal mobility assistance device for an example where the device is a walker with the light set.
Figure 3F:
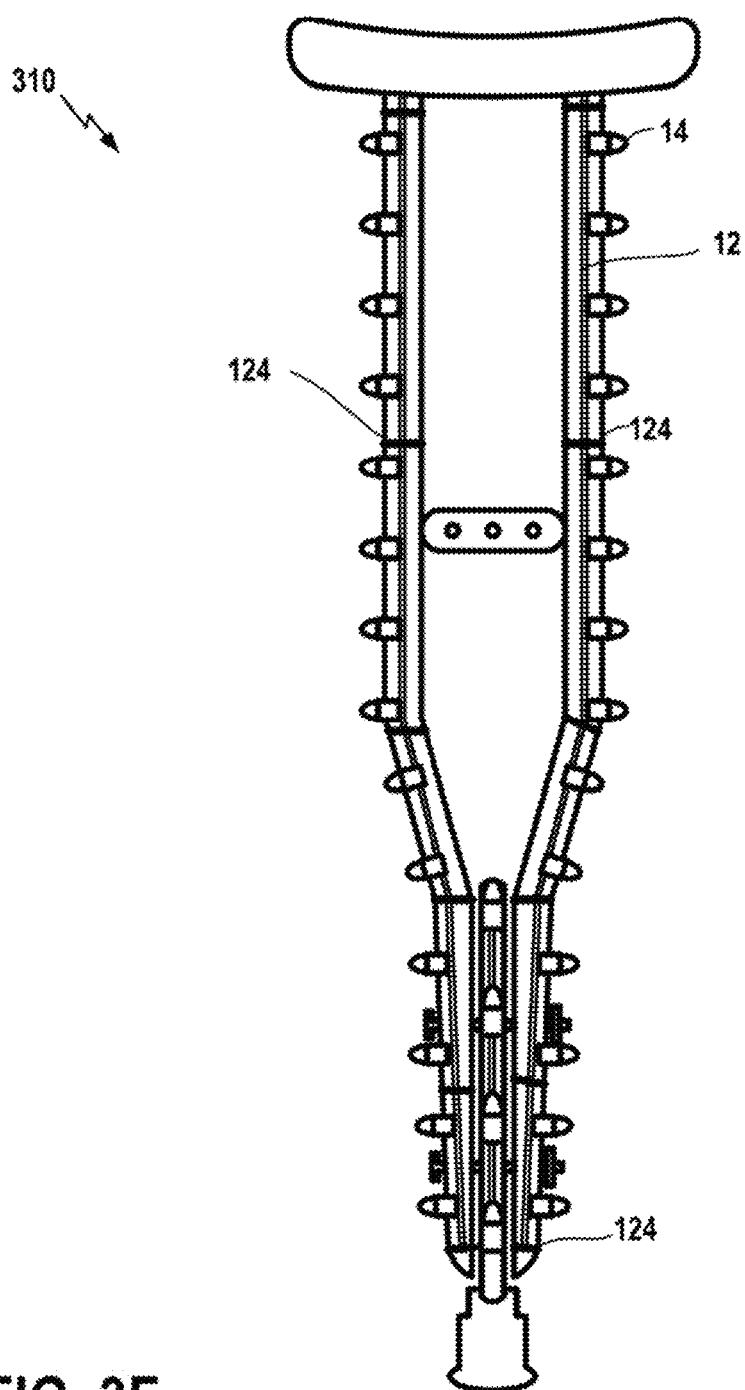
FIG. 3F is an illustration of a side view of the personal mobility assistance device for an example where the device is a crutch with the light set.

FIG. 3A is an illustration of a perspective view of the personal mobility assistance device 10 for an example where the device 10 is a child stroller 300 with the light set 12. FIG. 3B is an illustration of a perspective view of the personal mobility assistance device 10 for an example where the device 10 is a baby stroller 302 with the light set 12. FIG. 3C is an illustration of a perspective view of the personal mobility assistance device 10 for an example where the device 10 is a pet stroller 304 with the light set 12. FIG. 3D is an illustration of a side view of the personal mobility assistance device 10 for an example where the device 10 is a wheel chair 306 with the light set 12. FIG. 3E is an illustration of a perspective view of the personal mobility assistance device 10 for an example where the device 10 is a walker 308 with the light set 12. FIG. 3F is an illustration of a side view of the personal mobility assistance device 10 for an example where the device 10 is a crutch with the light set 12. FIGS. 3A-3F show some examples of attaching the light set 12 to different types of devices 10. The light sets can be attached to different portions of the devices in other examples. Also, each type of device may have any of numerous specific designs. In the interest of clarity, the illustrations of FIGS. 3A-3F do not necessarily depict all details of the light set and the mobility assistance devices. For example, the illustrations of FIGS. 3A-3F are not necessarily to scale and do not necessarily show all of the light emitters that may be used on a light set.

Figure 4A:
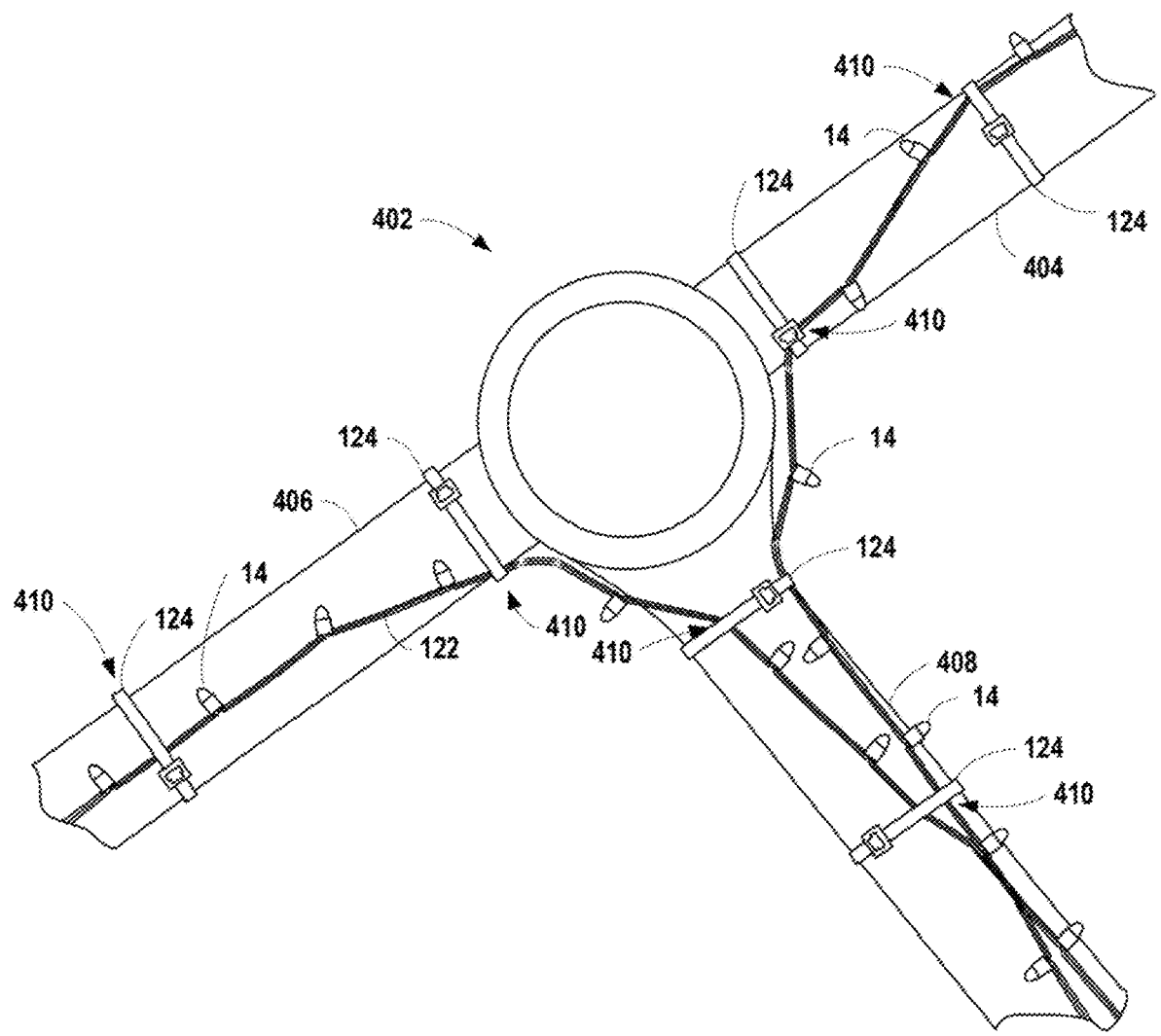
FIG. 4A is an illustration of a side view of an example of a portion of a mobility assistance device with a linkage mechanism.
Figure 4B:
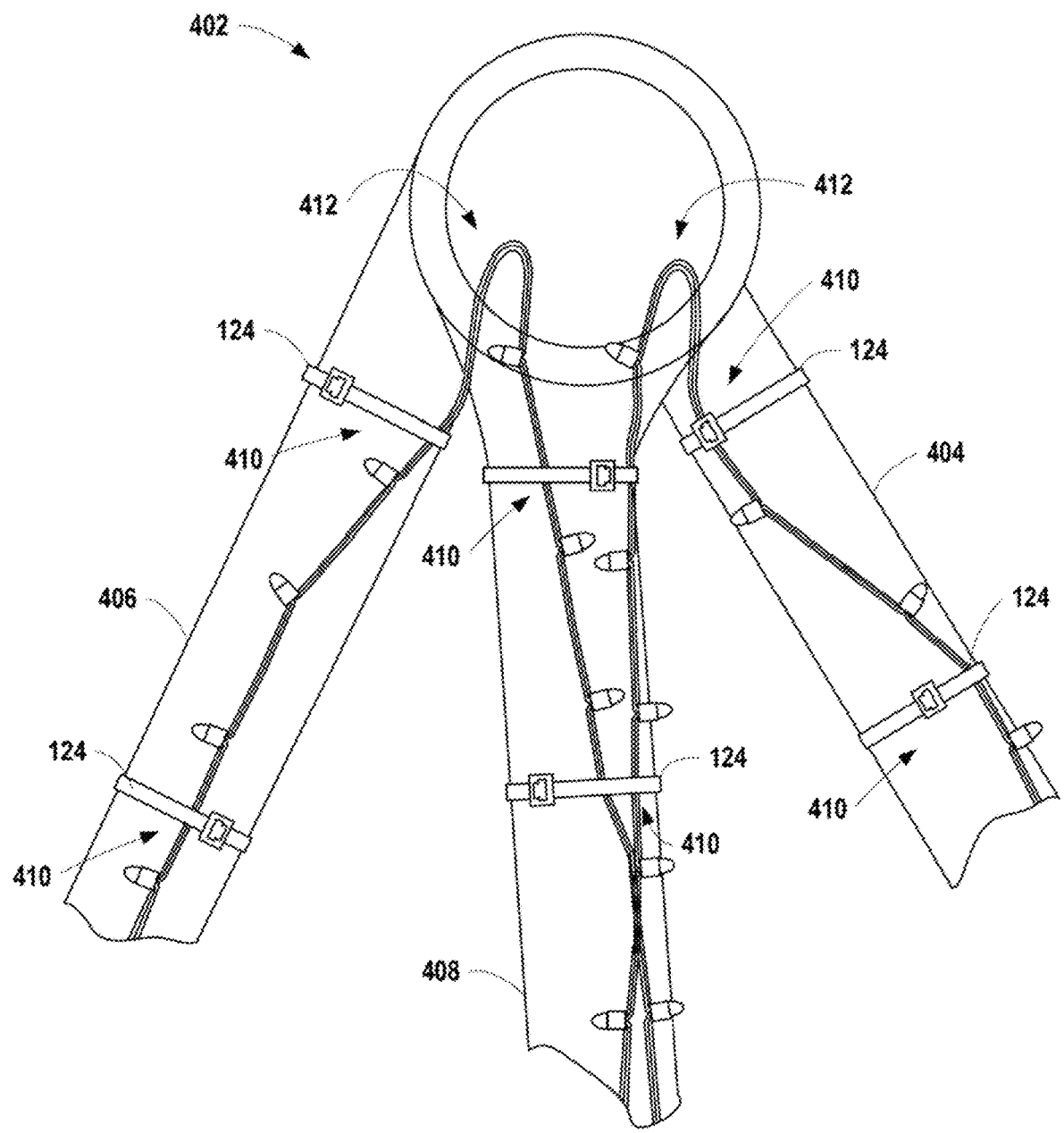
FIG. 4B is an illustration of a side view of the linkage mechanism in a second configuration.

FIG. 4A is an illustration of a side view of an example of a portion of a mobility assistance device with a linkage mechanism 402. Many mobility assistance devices include linkage mechanisms 402 to facilitate adjustment for size or performance or to facilitate reconfiguration of the device 10 for portability. Typically, the linkage mechanism 402 is securable or lockable in at least one position. In most situations, the linkage mechanism 402 is lockable in a position where the device 100 is in a configuration for use. The linkage mechanism 402 may also be locked (secured) in other positions, in some circumstances. For example, the linkage mechanism 402 may be lockable in a portability configuration for transporting the device 10 in a compact form. Where the linkage mechanism facilitates adjustment, there may be multiple lockable positions. For the example of FIG. 4A, the linkage mechanism 402 is a hinge that is lockable in at least one position that secures three members 404, 406, 408 of the device frame in a configuration for using the device 100. When released, the hinge allows rotation of a first member 404, second member 406 and third member 408 relative to each other. Referring briefly to FIG. 4B, FIG. 4B is an illustration of the hinge in another position when the members have rotated relative to each other. When secured in the position shown in FIG. 4A, the three members 404, 406, 408 are fixed (locked) relative to each other and the device 100 can be used. The hinge may allow any number of device members to move relative to each other. For example, the hinge may facilitate movement of two members of the device.

Another example of a linkage mechanism includes a slide where at least two members can slide relative to each other and are lockable in at least one position. Devices may include other types of linkage mechanisms as well as combinations of mechanisms for allowing the device to be reconfigured.

Therefore, a mobility assistance device may include one or more linkage mechanisms that allow reconfiguration of the device. For the examples discussed herein, the light sets are secured to components of the device in such a way that the flexible conductor 122 is essentially immobile relative to the device component at the point where flexible conductor is secured on the device component. As a result, for the examples, the light set 12 is attached to the device in such a way that the light set is not damaged when the device is reconfigured and the light set does not restrict reconfiguration of the device. As shown in FIG. 4A, at least one light set is secured to the three members 404, 406, 408. A flexible mechanical fastener 124 secures the light set 12 to the device 100 at each of several attachment points 410 on the device components 404, 406, 408.

FIG. 4B is an illustration of a side view of the linkage mechanism 402 in a second configuration. For the example of FIG. 4B, the members 404, 406, 408 have been rotated relative to each other to place the device in a compact configuration. The light set 12 is attached to the device such that the linkage mechanism can be placed in the second configuration without restricting the movement of the linkage mechanism or damaging the light set. Portions 412 of the light set between the connection points 410 on either side of the linkage mechanism are not stressed. The flexible conductor 122 is sufficiently flexible to allow repeated reconfiguration of the device. The two portions 412 in the example, therefore, form loops with the additional slack created when the linkage mechanism is placed in the compact configuration.

Figure 5:
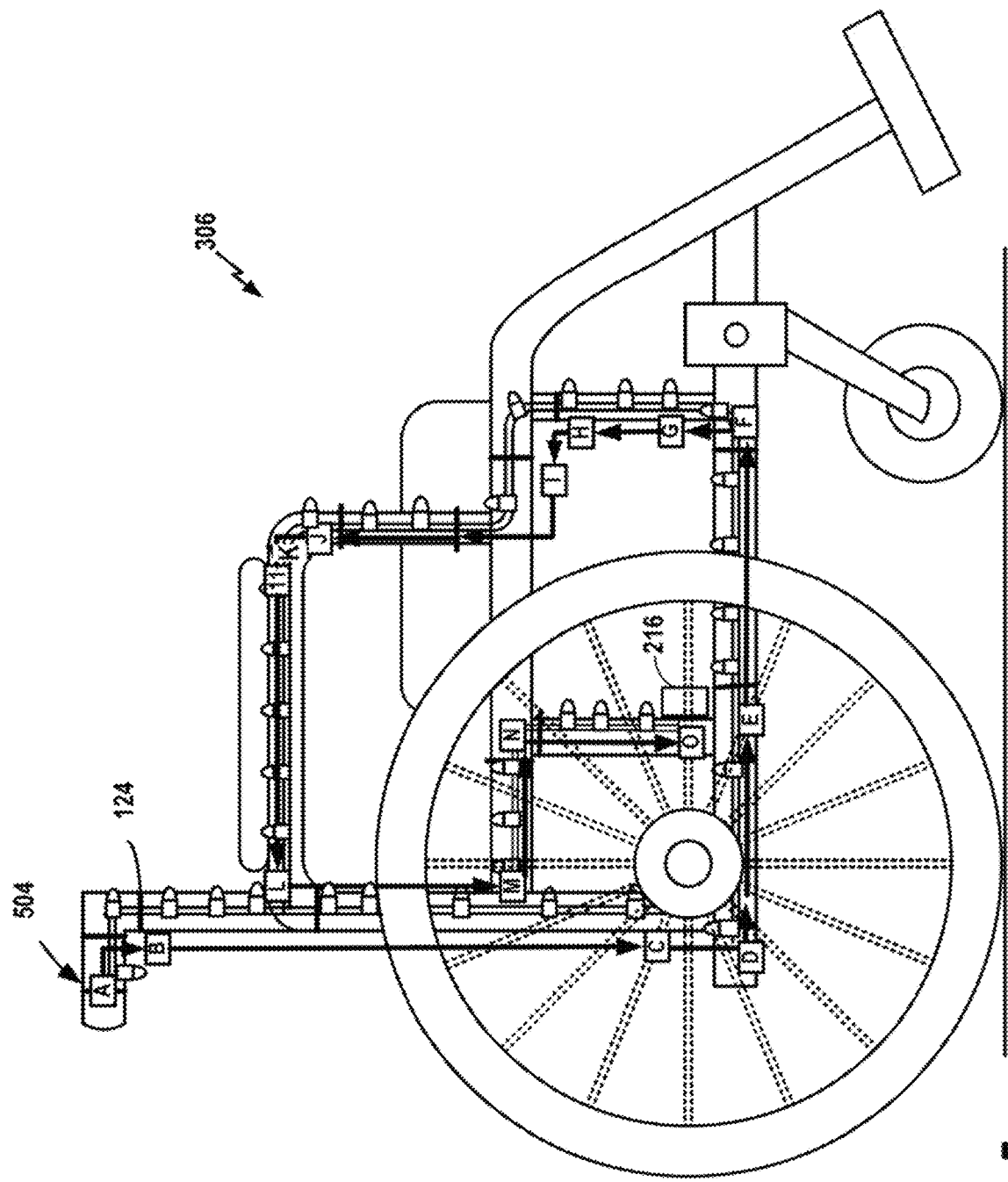
FIG. 5 is an illustration of a side view of an example of a light set attachment route.

FIG. 5 is an illustration of a side view of an example of a light set attachment route 500 and sequence. Although for the example the mobility assistance device 10 is a wheel chair 306, the light set attachment procedure can be applied to any type of mobility assistance device 10. The sequence is illustrated with lettered boxes and arrows to indicate the attachment route 500 and sequence of the light set 12. For the example, the light attachment route 500 begins at a start point 502 at the handle and continues along the direction of the arrows to the lettered boxes in ascending alphabetical order. Accordingly, the light set is attached to the frame of the wheel chair along the route from box A to box B and so on to box O. The wheel chair 306 includes at least three linkage mechanisms sometimes referred to as "break points". For the examples herein, the start point, end point, and the attachment route are selected to achieve several goals. One goal includes positioning the housing 216 in an inconspicuous location. Another goal includes minimizing the number of light emitters that are hidden from view. A third goal includes positioning the end of the light set opposite the housing 216 at a transition point of the frame of the device or at an end of a component of the device. Yet another goal is to allow the linkage mechanisms to be fully adjustable. For the example, light set end opposite the housing 216 is attached at the handle at the start point 502 and routed along the route 500 along the frame to the end point at box O. The light set 12 is attached at the start point 502 with a mechanical fastener 124 and at each side of a change in direction of the route 500. Additional mechanical fasteners 124 are applied along long straight sections of the route 500. A suitable spacing between mechanical fasteners 124 along straight sections is six to eight inches. In some circumstances, a larger spacing may be used. For example, a spacing of 10 inches or more may be used along straight sections that are not likely to be disturbed by the occupant of the device 10 or others. In some circumstances, spacing smaller than six inches may be used along straight sections. For example, if the device is a child stroller 300 and the straight section is easily accessible by the child riding in the stroller 300, it may be advantageous to use a spacing of four inches or less. Such smaller spacing reduces the likelihood that the child will be able to create slack in the light set strand by pulling on the light set, thereby reducing the chances of the child placing a limb between the light set strand and the device 10 or otherwise becoming tangled with the light set due to the additional slack. Depending on the particular installation, other spacing dimensions can be used and can range anywhere from 1 to 20 inches.

Figure 6A:
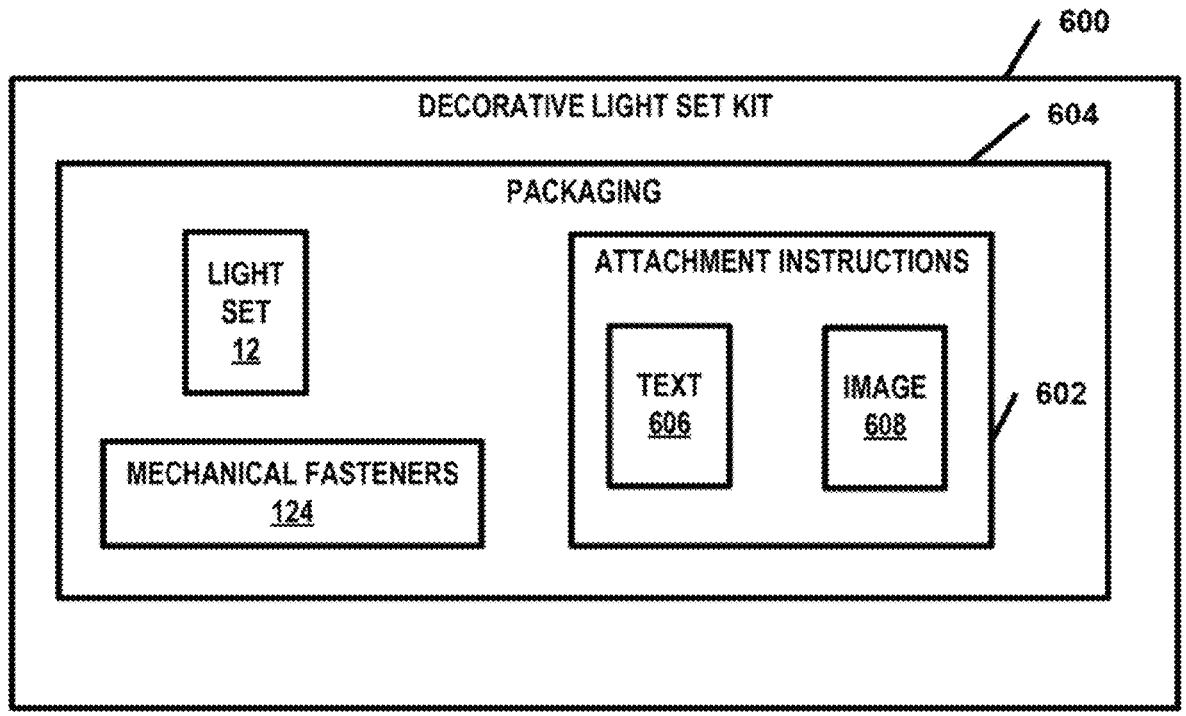
FIG. 6A is a block diagram of an example of a light set kit.

FIG. 6A is a block diagram of an example of a light set kit 600. For the example of FIG. 6A, the light set kit 600 includes a light set 12, mechanical fasteners 124 and attachment instructions 602. In some situations, the light set kit 600 also includes packaging 604 that holds the other components of the kit 600. The attachment instructions 602 include a description of a method of attaching the light set 12 to a mobility assistance device 10. The attachment instructions 602 may describe a method for attaching the light set 12 to multiple types of mobility assistance devices, a single type of mobility assistance device, multiple specific devices or a single specific device. Therefore, the instructions may include descriptions for attaching light sets to child strollers, wheel chairs, pet strollers, knee strollers, walkers, crutches, and canes, or may include descriptions only for wheeled devices, for example. In some situations, the attachment instructions 602 may only be directed to one type of device such as child strollers. In other situations, the instructions may be directed to a specific model of device (e.g., a particular child stroller model). In still other circumstances, the attachment instructions may include attachment descriptions for each of multiple specific models (e.g., instructions covering each of multiple child stroller models). For the examples herein, the attachment instructions 602 include text 606 and images 608 describing a method of attaching a light set 12 to a mobility assistance device 10 including at least a location for placing the housing 216 and attachment route 500 along the components of the device 100. The attachment instructions may be printed on paper or may be provided on an electronic storage medium such as a thumb drive, diskette, compact disc (CD) or other type of memory device. In another example described below, the attachment instructions 602 are provided to the user by providing a code or other information that allows the user to access the instructions stored at remote location such as a server connected to the Internet.

Figure 6B:
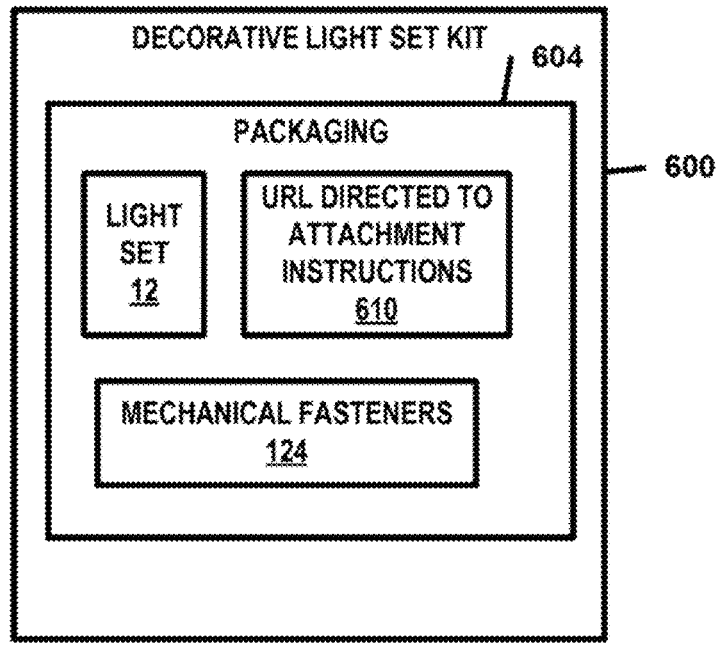
FIG. 6B is a block diagram of an example of a light set kit where the attachment instructions are provided on the Internet.

FIG. 6B is a block diagram of an example of a light set kit 600 where the attachment instructions are provided on the Internet. For the example of FIG. 6B, the light set kit 600 includes a light set 12, mechanical fasteners 124 and a Uniform Resource Locator (URL) 610 to a resource on the Internet including attachment instructions. The attachment instructions may include any combination of text, images, photographs, and video that describe the process for attaching the light set to a mobility device. The instructions provided on the Internet may also include specific instructions for specific mobility device models allowing the installer to access the specific instructions for attaching the light set to the particular model on which the light set is being installed by the installer.

Figure 7:
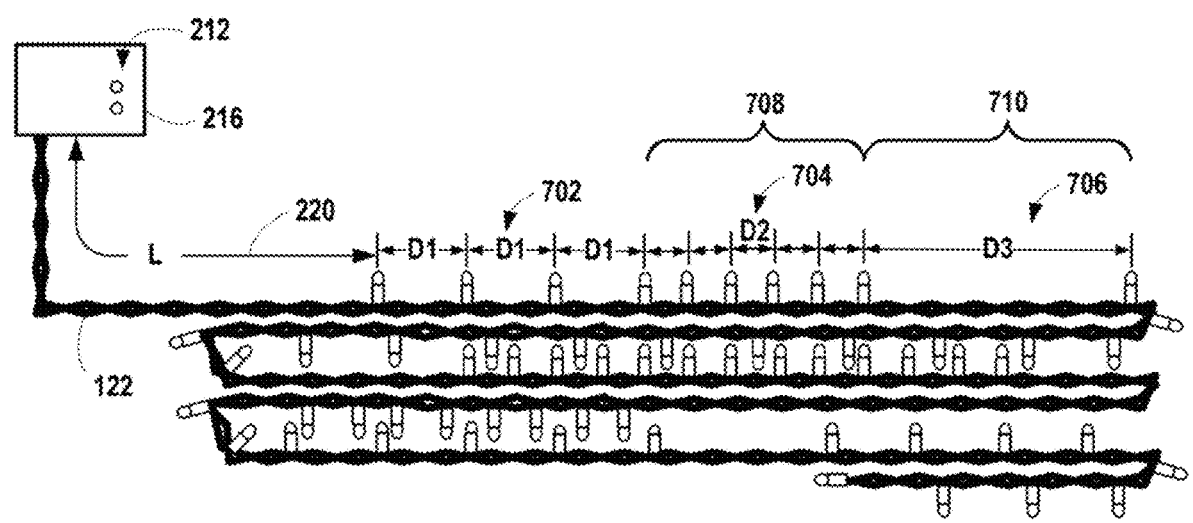
FIG. 7 is an illustration of a model specific light set for an example where the light set is designed for a particular model of mobility assistance device.

FIG. 7 is an illustration of a model specific light set 700 for an example where the light set 700 is designed for a particular model of mobility assistance device. A light set 12 designed for a specific model (or small number of similar models) is referred to herein as a model specific light set 700. For the example, at least the total length 224, spacing between light emitters 222 and the lead length 220 are selected in accordance with the structure and dimensions of a particular mobility assistance device 100. The exemplary light set 700 has at least three different light emitter spacing values 702, 704, 706. A first spacing (D1) 702 is used in portions of the light set 700 that are attached to portions of the device 100 that are to be highlighted. A second spacing (D2) 704 is the smallest spacing relative to other spacing on the light set and is used in portions 708 of the light set 700 that are attached to areas of the mobility assistance device 100 that are emphasized. In other words, the narrow spacing sections 708 using the second spacing (D2) 704 include more light emitters per unit length relative to other sections of the light set 12 in order to accentuate the portions of the device where the narrow spacing sections 708 are attached. A third spacing (D3) 706 is used for sections 710 that will not be visible or that will be attached to components of the device that are not to be highlighted. The third spacing (D3) 706 is relatively large and is typically for extending the light set from one component of the device to another without highlighting the intermediate area.

The lead length 220 is also selected to accommodate a specific device. For example, the lead length may be selected such that it allows for placing the housing in a preferred location while having the first light emitter positioned at a preferred location on the device. In one situation, the preferred location for the housing is a pocket or other compartment on the device and the first emitter is preferably positioned at an end of a device component. The lead length 220 is selected such that the lead portion 218 can be easily routed between the two locations without excessive slack.

The total length 224 of the model specific light set 700 is selected based on the dimensions of the device and the light set attachment route. For the examples, the length is such that the end of the light set is attached at the end of the preferred route. In other words, it is preferred that the end of the light set does not occur in the middle of a device component that is highlighted.

Figure 8:
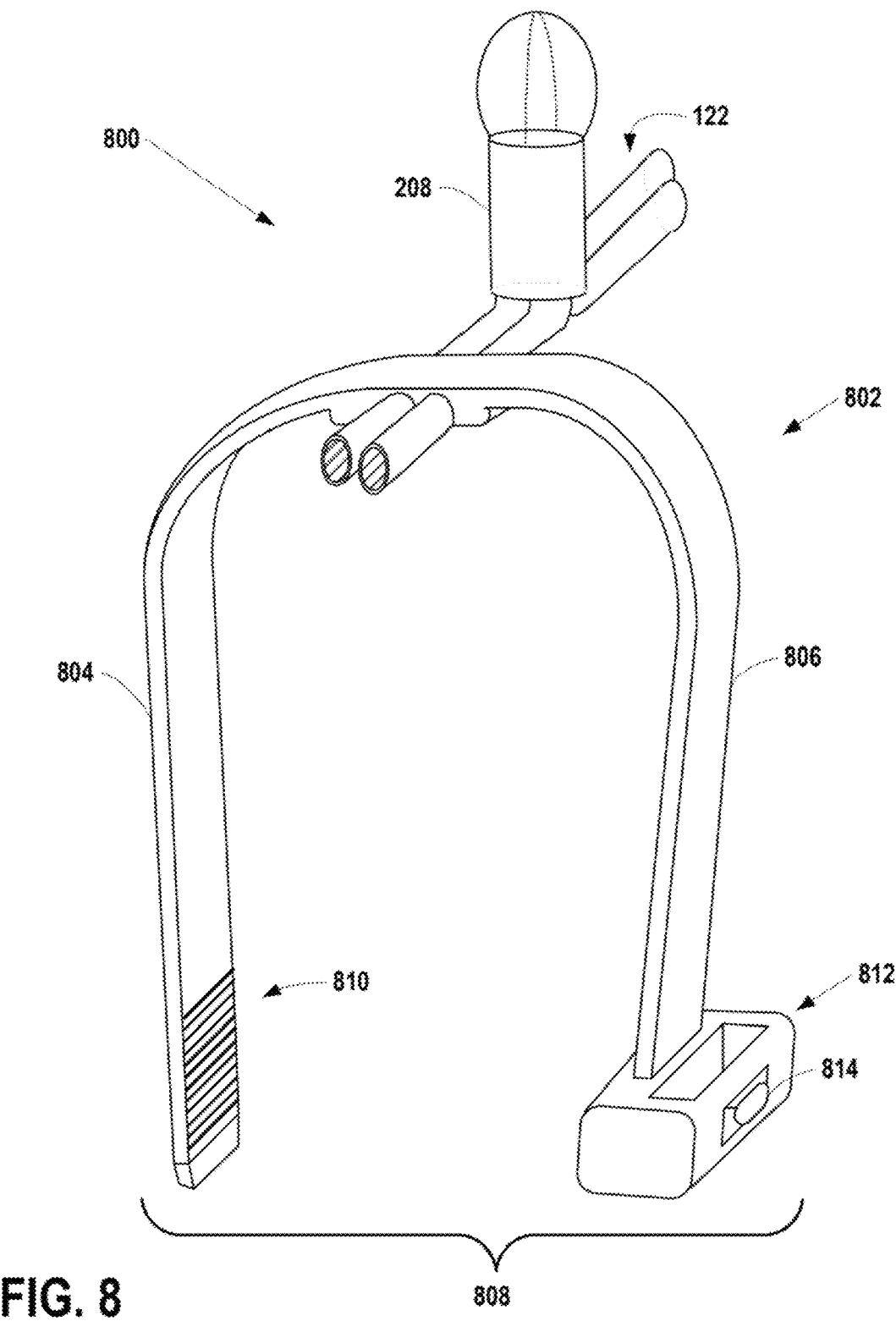
FIG. 8 is an illustration of portion of a light set for an example where the mechanical fasteners are part of the light set.

FIG. 8 is an illustration of a portion of a light set 800 for an example where the mechanical fasteners 802 (124) are part of the light set 800. For the example of FIG. 8, a plurality of the mechanical fasteners is permanently attached to the light set 800. Typically, each flexible plastic mechanical faster 802 is molded to the flexible conductor 122 during manufacturing. Other techniques can be used to attach the mechanical fasteners 802 to the light set 800. For example, the mechanical fasteners 802 can be attached by gluing, bonding, or otherwise mechanically securing the mechanical fasteners 802 to the light set 800.

Each mechanical fastener 802 includes a first band 804 and a second band 806 where the first band 804 is securable to the second band 806 through a fastening mechanism 808 that includes features 810 on the first band 804 and features 812 on the second band 806. For example, the first band 804 may include ridges 808 or other protruding features that engage a receiver 810 on the second band 806 where the first band 804 is inserted into the receiver 812 which grasps the first band 804 such that it cannot be removed. When the light set 800 is attached to the mobility assistance device, the bands 804, 806 of the mechanical fasteners are wrapped around a component of the device and the first band 804 is secured to the second band 806. For the examples herein, the fastening mechanism is releasable to allow removal of the mechanical fastener 802. Techniques such as those used for releasable cable ties may be used, for example. The releasable fastening mechanism may require a tool to actuate the release. In one example, the tool (not shown) engages a release trigger 814 on the receiver to allow the first band to be removed from the receiver. Such tool releasable techniques may be useful where the mobility assistance device is carrying a child and the releasable fastening mechanism requiring a tool minimizes the possibility of the child removing or loosening the light set. Other child-safe mechanisms may also be used in some circumstances.

In some circumstance, the mechanical fasteners 802 are attached along the length light set at equal spacing. In other situations, the spacing may not be uniform. Where the light set is a model specific light, for example, the spacing is selected based on the particular model of the mobility assistance device.

Figure 9:
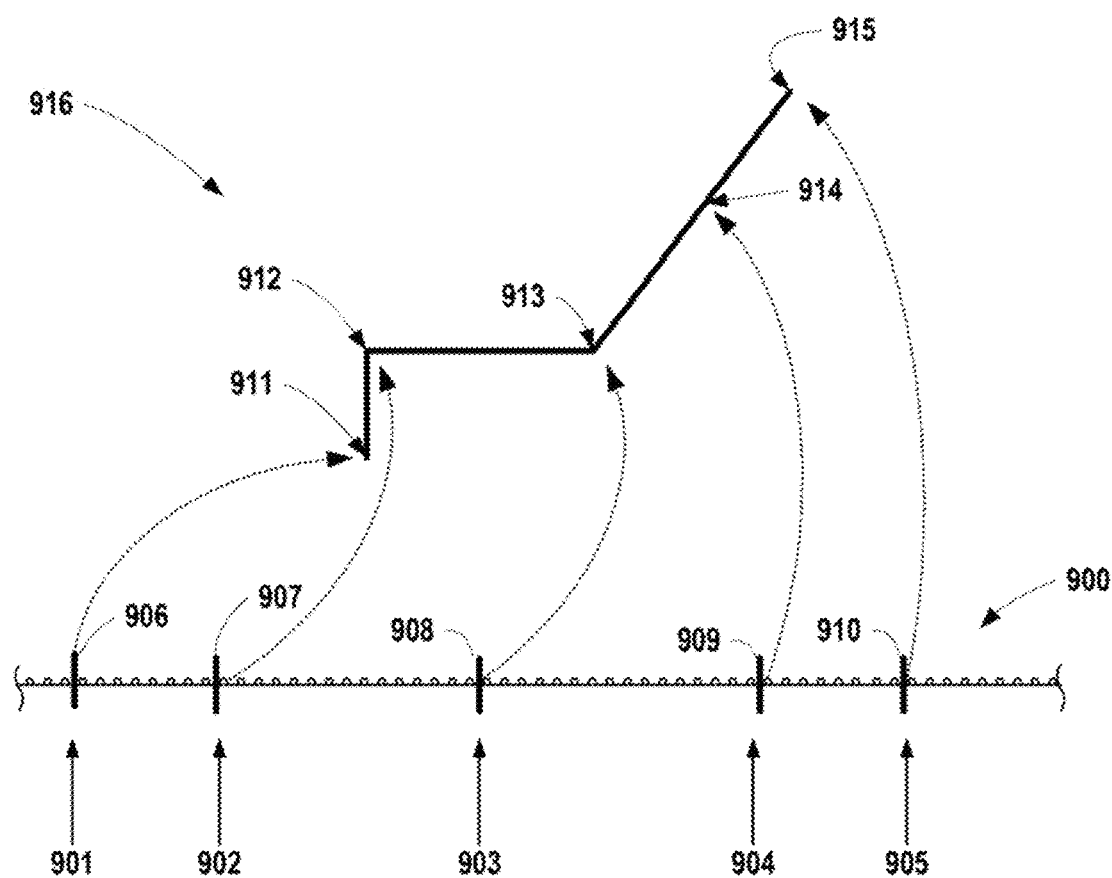
FIG. 9 is an illustration of a portion of an example of a model specific light set where the position of each mechanical fastener is selected based on a specific mobility assistance device model.

FIG. 9 is an illustration of a portion of an example of a model specific light set 900 where the position of each mechanical fastener is selected based on a specific mobility assistance device model. For the example of FIG. 9, the position 901-905 of each fastening mechanism 906-910 along the length of the light set 900 is strategically selected to coincide with features 911-916 on the mobility assistance device. For example, the mechanical fasteners can be secured to the light set at positions along the length of the light set that coincide with the ends of frame members and at points where the light set strand changes direction to follow the features of the mobility assistance device. FIG. 9 shows a side view of a portion of a frame 917 of a mobility assistance device for which the light set 900 is designed. For the example of FIG. 9, the positions 901, 902, 903, 905 of four mechanical fasteners 906, 907, 908, 910 coincide with the ends of frame members 811, 812, 813, 915 where the light set changes direction when attached to the frame 916. In some situations, a mechanical fastener has a position that does not correspond in a change in direction of the light set route. In FIG. 9, for example, one mechanical fastener 909 has a position 909 corresponding to a point 914 in between inflection points along the attachment route of the light set 900. Such positions may be selected to avoid excessive slack and to tightly secure the light set along straight sections of the device.

Figure 10A:
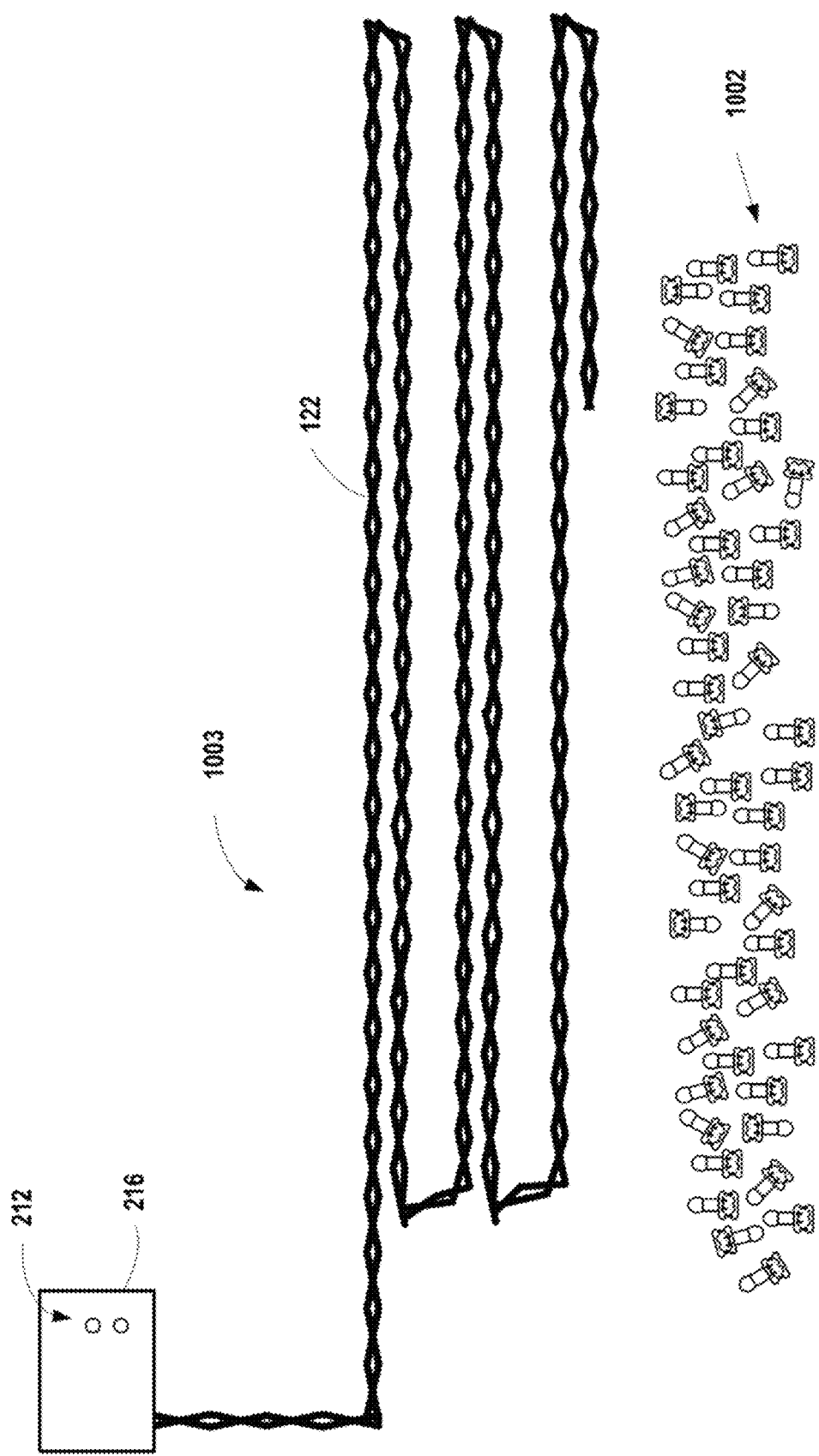
FIG. 10A is an illustration of an example of a customizable light set.

FIG. 10A is an illustration of an example of a customizable light set 1000. The customizable light set 1000 includes a flexible conductor 122 and a plurality of attachable light emitters 1002 where the attachable light emitters 1002 can be secured and connected to the flexible conductor at user-desired positions along the length of the flexible conductor 122. For the examples herein, the customizable light set 1000 is similar to the light sets discussed above except that the light emitters are not permanently attached to the flexible conductor 122. Accordingly, the customizable light set 1000 may include a flexible conductor 122, battery 202, controller 214, housing 216 and any combination of features discussed above. For the example, the light set includes a battery and controller connected to the flexible conductor 122, a plurality of flexible fasteners, and a plurality of attachable light emitters 1002 that are not attached to the flexible conductor when the light set is acquired by the user/installer. When the user obtained the light set 1000, in most circumstances, the customizable light set 1000 includes a light set core assembly 1003 and a plurality of attachable light emitters 1002 where the light set core is assembled and the light emitters 102 are not yet attached. The light set core assembly 1003 includes at least the flexible conductor 122 and a battery although, in most situations, the light set core assembly 1003 includes a housing connected to the flexible conductor and that encloses the battery, controller and includes a user interface 212.

In most situations, the light set 1000 is attached to a device by first attaching the flexible conductor 122 to the components of the device 10 with the flexible mechanical fasteners 124 and then attaching the attachable light emitters 1002 to the flexible conductor at the preferred locations. In some situations, however, the attachable light emitters 1002 can be attached to the flexible conductor 122 before the light set 1000 is secured to the device 10.

The customizable light set 1000 allows for efficient use of light emitters and a tailored light set installation on a mobility device 10. More specifically, the light emitters can be placed in locations on the device where illumination is desired and can be omitted along sections of flexible conductor 122 where illumination is not necessarily desired. The light emitter spacing can be adjusted in accordance with a desired appearance. For example, sections that are to be emphasized can include small light emitter spacing to increase the number of light emitters per length while spacing along other sections can be increased in order to create a contrast between the sections. Light emitters are not "wasted" along sections that are not seen as could be the case where the light emitters are permanently fixed and the installation requires muting through an area that will not allow the light emitters to be seen. Other advantages of the customizable light set 1000 include the ability for the user/installer to position light emitters with particular characteristics in selected locations. For example, in some situations, the customizable light set 1000 includes attachable light emitters 1002 having different colors allowing the user to further customize the installation. In addition to selecting particular colors, the pattern of colors can be selected.

Figure 10B:
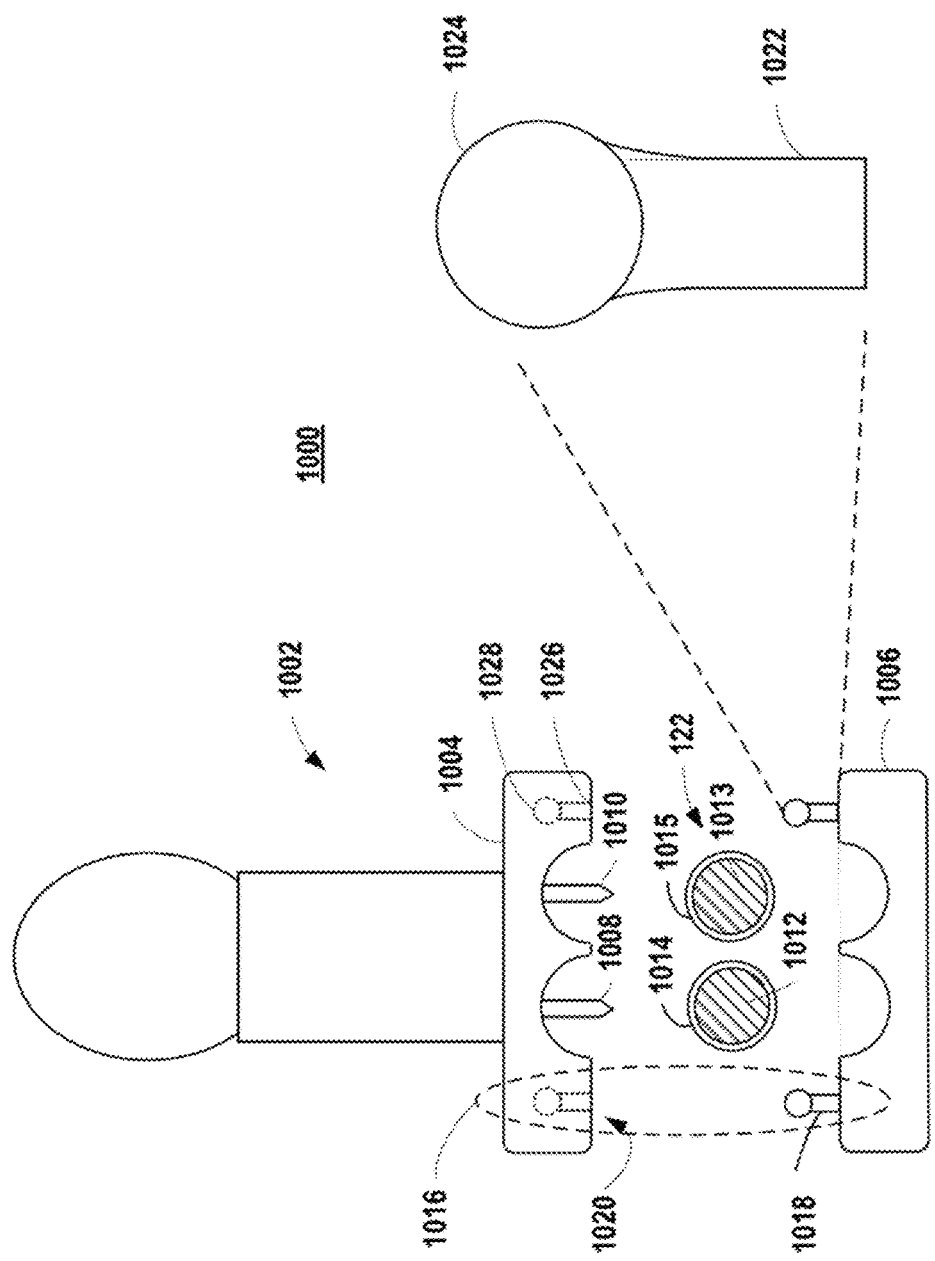
FIG. 10B is an illustration of a side view of a portion of an example of a customizable light set.
Figure 10C:
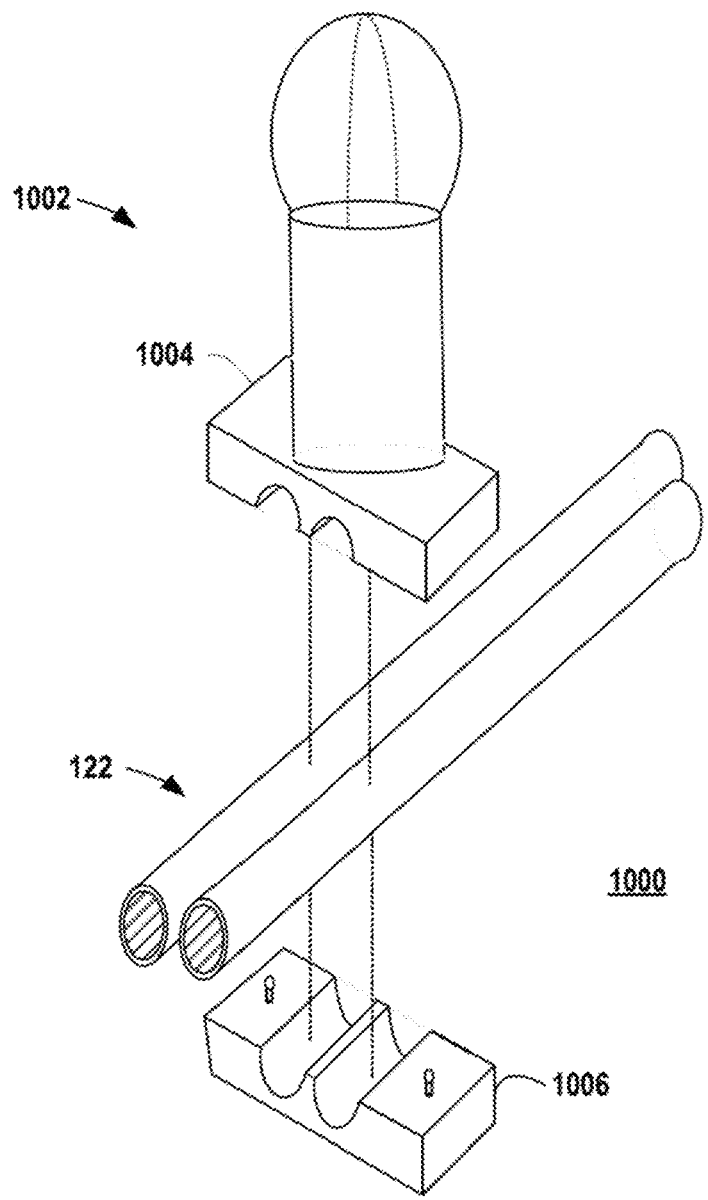
FIG. 10C is an illustration of a perspective view of a portion of an example of a customizable light set.
Figure 10D:
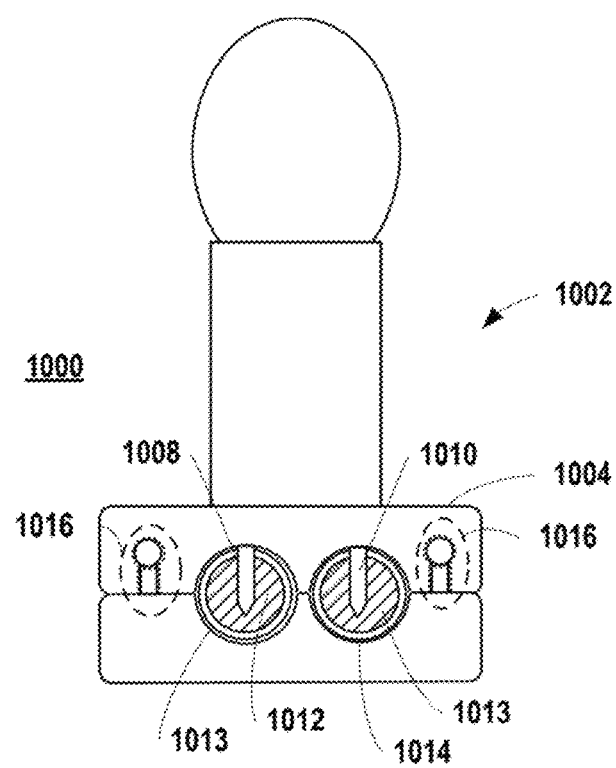
FIG. 10D is an illustration of a side view of the customizable light set showing an attachable light emitter secured to the flexible conductor.
Figure 10E:
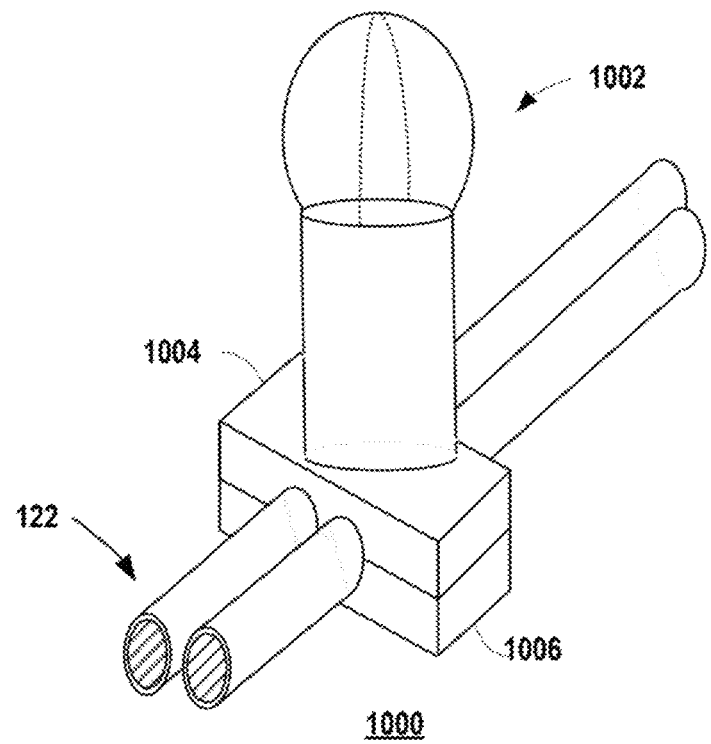
FIG. 10E is an illustration of a perspective view of the customizable light set showing an attachable light emitter secured to the flexible conductor.

FIG. 10B is an illustration of a side view and FIG. 100C is an illustration of a perspective view of a portion of an example of a customizable light set 1000. FIG. 10D is an illustration of a side view and FIG. 10E is an illustration of a perspective view of the customizable light set 1000 showing an attachable light emitter 1002 secured to the flexible conductor 122. For the example, each attachable light emitter 1002 includes an upper component 1004 and lower component 1006 that can be separated from each other sufficiently to allow the flexible conductor 122 to be positioned between the two components 1004, 1006. After the user positions the attachable light emitter 1002 at a desired attachment point along the length of the flexible conductor, the lower component 1006 is secured to the upper component 1004 such that two penetration tabs 1008, 1010 make contact with each electrical conductor 1012, 1013 of the flexible conductor 122, respectively. Each penetration tab 1008, 1010 pierces the insulation 1014, 1015 covering the electrical conductor 1008, 1010 and penetrates the electrical conductor 1013, 1014. A fastening mechanism 1016 secures the upper component to the lower component. For the example, the fastening mechanism 1016 includes a plurality of prongs 1018 on the lower component 1006 that each engages a prong receiver 1020 on the upper component 1004. The user presses the two components together to press the prongs 1018 into the prong receivers 1020 to "snap" the two components together and attach the attachable light emitter to the flexible conductor 122. The prongs 1016 and prong receivers 1018 have a configuration and composition such that prongs 1018 can be pushed into the prong receiver with limited resistance to connect the two components. After the prongs are fully inserted into the prong receivers 1020, the components cannot be separated without force. An example of a suitable configuration and composition of fastening mechanism 1016 includes a prong that has a shaft 1022 that is smaller than a tip 1024 where the prong receiver is formed within a flexible material of the upper component 1004. In such a configuration, the larger prong tip 1024 is squeezed through the narrower shaft opening 1026 of the prong receiver 1016 and settles into a larger tip area 1028 of the prong receiver 1016 when the prong 1018 is fully inserted. In some situations, the material of the prong 1018 is additionally/alternatively made of a flexible material.

Any number of prong-receiver prong pairs can be used. For example, a single pair can be used on each side of the flexible conductor. In another example, two pairs can be included on each side of the flexible conductor such that four pairs are included on each attachable light emitter 1002. Numerous other combinations and variations of the example can also be implemented. For example, prongs can be included on both the lower component and upper component. Also, prongs can be included only on the upper component in some situations.

FIG. 10D is an illustration of a side view of the exemplary customizable light set 1000 where the attachable light emitter 1002 is secured to the flexible conductor 122. As mentioned above, the penetration tabs make contact with the conductors when the light emitter is secured to the flexible conductor. As the lower and upper components are pressed together the penetration tabs puncture the insulation of the flexible conductor and become embedded in the electrical conductors making an electrical connection between each conductor and an electrical port of the light emitter. For example, where the light emitter is an LED, one conductor is electrically connected to one port of the LED and the other conductor is electrically connected to the other port of the LED.

In some circumstances, the flexible conductor includes more than two electrical conductors and at least some light emitters may include more than two electrical ports. For example, a light emitter may include more than one LED. Such a technique may be used to generate a particular color by mixing the colors of two differently colored emitting LEDs. Where different voltages across the two LEDs are adjusted or otherwise varied by the controller, additional electrical conductors may be included in the flexible conductor. As a result, the attachable light emitter 1002 may be configured to attach to a flexible conductor including more than two electrical conductors and may include more than two penetration tabs in some circumstances.

Other types of fastening mechanisms can be used. For example, the lower component can be connected to the upper component at a hinge such that a fastening mechanism is secured at the opposite end of the hinge. Other examples include clasps at the outer portion of the upper and lower components and threaded mechanism where the lower component 1006 is screwed to the upper component 1004.

Figure 11:
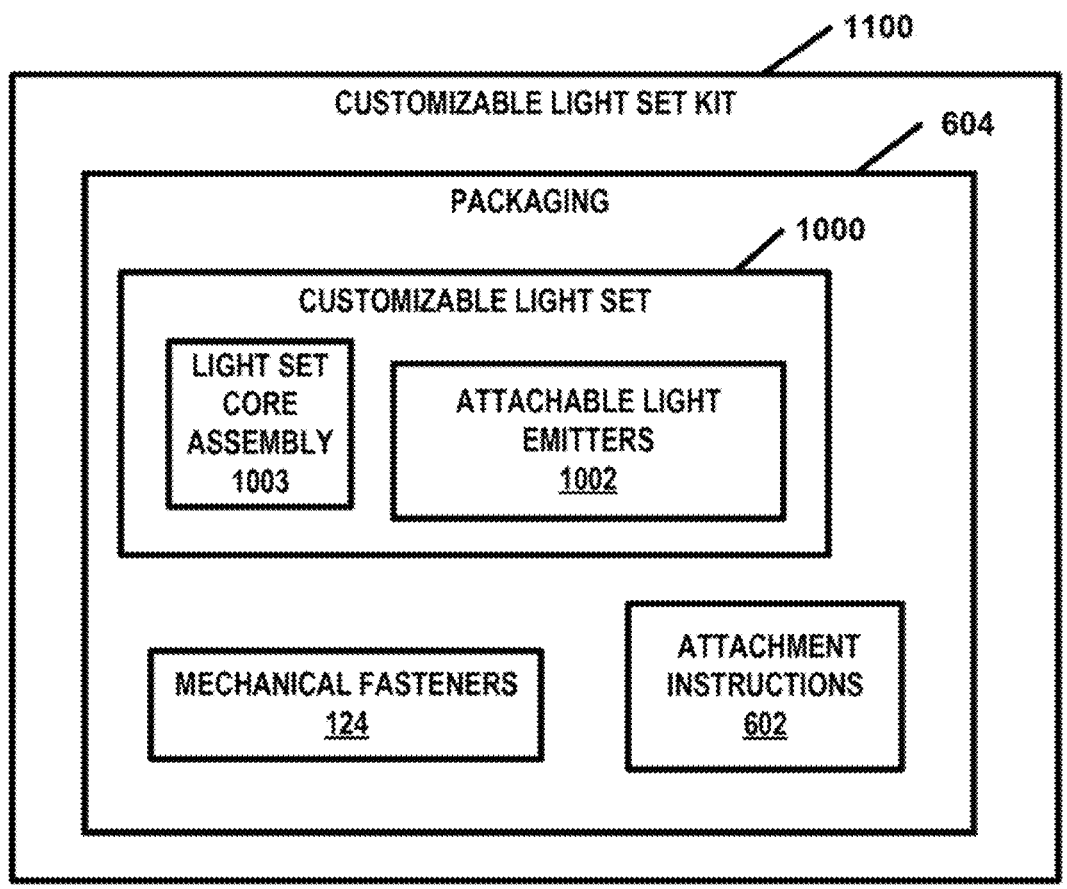
FIG. 11 is a block diagram of an example of a customizable light set kit.

FIG. 11 is a block diagram of an example of a customizable light set kit 1100. For the example of FIG. 11, the customizable light set kit 1100 includes a customizable light set 12, mechanical fasteners 124 and attachment instructions 602. In some situations, the light set kit 600 also includes packaging 604 that holds the other components of the kit 1100. The customizable light set includes at least a light set core assembly 1003 and a plurality of attachable light emitters 1002. In one example, the purchaser of the light set kit 1100 may select the color of the light emitters 1002 at the time of purchase. The attachment instructions 602 include a description of a method of attaching the light set to a mobility assistance device. The attachment instructions may describe a method for attaching the light set to multiple types of mobility assistance devices, a single type of mobility assistance device, multiple specific devices or a single specific device. Therefore, the instructions may include descriptions for attaching light sets to child strollers, wheel chairs, pet strollers, knee strollers, walkers, crutches, and canes or may include descriptions only for wheeled devices, for example. In some situations, the instructions may only cover one type of device such as only child strollers. In other situations, the instructions may only cover a specific model of device (e.g., a particular child stroller model). In still other circumstances, the attachment instructions may include attachment descriptions for each of multiple specific models (e.g., instructions covering each of multiple child stroller models). In some situations, the instructions can be omitted.

Other combinations of examples discussed above can be used in some implementations of the customizable light set kit. For example, in some situations, the light set core assembly may include a plurality of the mechanical fasteners that are permanently attached to the light set 1000.

Figure 12A:
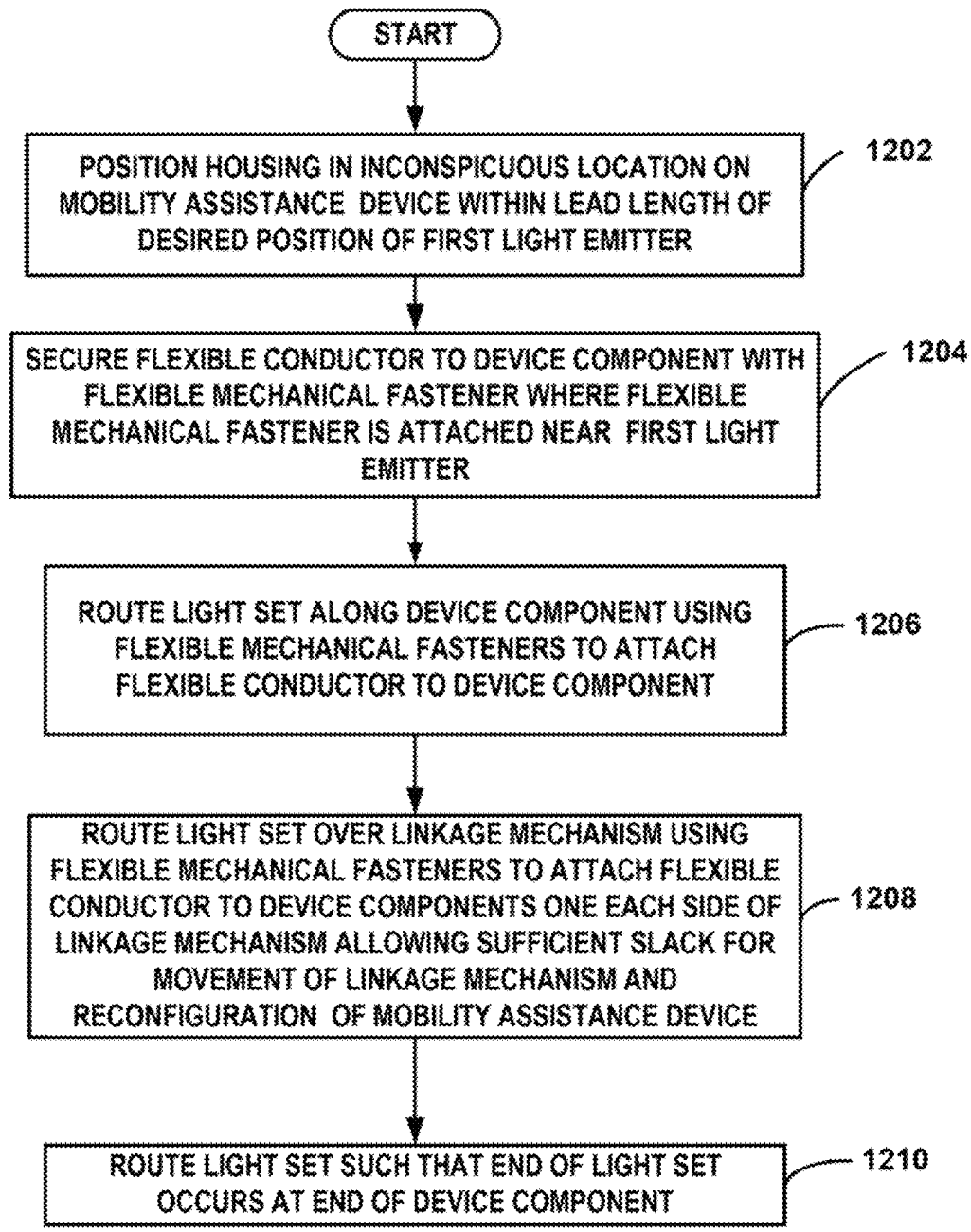
FIG. 12A is a flow chart of method of attaching a light set to a mobility assistance device.

FIG. 12A is a flow chart of a first example of a method of attaching a light set to a mobility assistance device 10. The method can be used for installing a light set to any type of wheeled or non-wheeled mobility assistance device. The order of the steps may be changed in some circumstances and some steps may be omitted.

At step 1202, the housing 216 is positioned in an inconspicuous location on the mobility assistance device within a distance of the lead length from the desired position of the first light emitter. Examples of inconspicuous locations include floors and under the seat storage compartments of the mobility assistance device 10. Preferable locations for the housing 216 include locations that will not result in prolonged exposure of the housing to heat or moisture. In some situations, the housing 216 is attached to the frame of the device 10.

At step 1204, the flexible conductor is secured to a device component with a flexible mechanical fastener where the flexible mechanical fastener is attached near the first light emitter.

At step 1206, the light set is routed along the device component using flexible mechanical fasteners to attach flexible conductor to the device component. In one example, a flexible mechanical fastener is attached at every ten inches along straight sections of the light set route to attach the light set to the device 10. At each change in direction of the route, flexible mechanical fasteners are attached at both sides of the route direction change. For example, if the light set is attached along a frame of the device and the frame has a component that is angled or the route traverses a path along a first component to a second component that has an angle to the first component different than 180 degrees, flexible mechanical fasteners 124 are attached before and after the change in direction. In some situations, a route along straight section may have flexible mechanical fasteners spaced at a distance less than ten inches. For example, where the position and/or angle of the light emitters changes along the route, flexible mechanical fasteners may assist properly positioning the light set.

At step 1208, the light set is routed over linkage mechanism using flexible mechanical fasteners to attach the flexible conductor to the device components on each side of the linkage mechanism allowing sufficient slack for movement of the linkage mechanism and reconfiguration of the mobility assistance device.

At step 1210, the light set is routed such that the end of the light set occurs at the end of the device component. Preferably, the light emitter farthest from the housing along the length of the flexible conductor is positioned to avoid an appearance that the light set route ends other than an end of a device component. For example, the farthest light emitter should not be positioned in the middle of a frame member in most situations.

Therefore, for the example of FIG. 12A, the light set is attached to the mobility assistance device by positioning the housing in an inconspicuous location and attach the light set to the device using flexible mechanical fasteners along a route that traverses the features of the mobility device 10 to an end point that coincides with an end point of a device component. For the examples, the light set is semi-permanently secured to the device such that children and pets are not able to easily remove the light set from the frame. As discussed above, permanent cable ties may be used as the flexible mechanical fasteners where the cable ties must be cut to remove the light set. Where releasable fasteners, such as reusable cable ties, are used, safety can be increased by using releasable fasteners that require a tool to remove the fastener. For the examples herein, the light set is positioned such that no component of the light set interferes with normal operation of the device. For example, in most situations, the light set should not interfere with rotation of wheels, maneuvering the device, reconfiguring the device, or transporting the device.

Figure 12B:
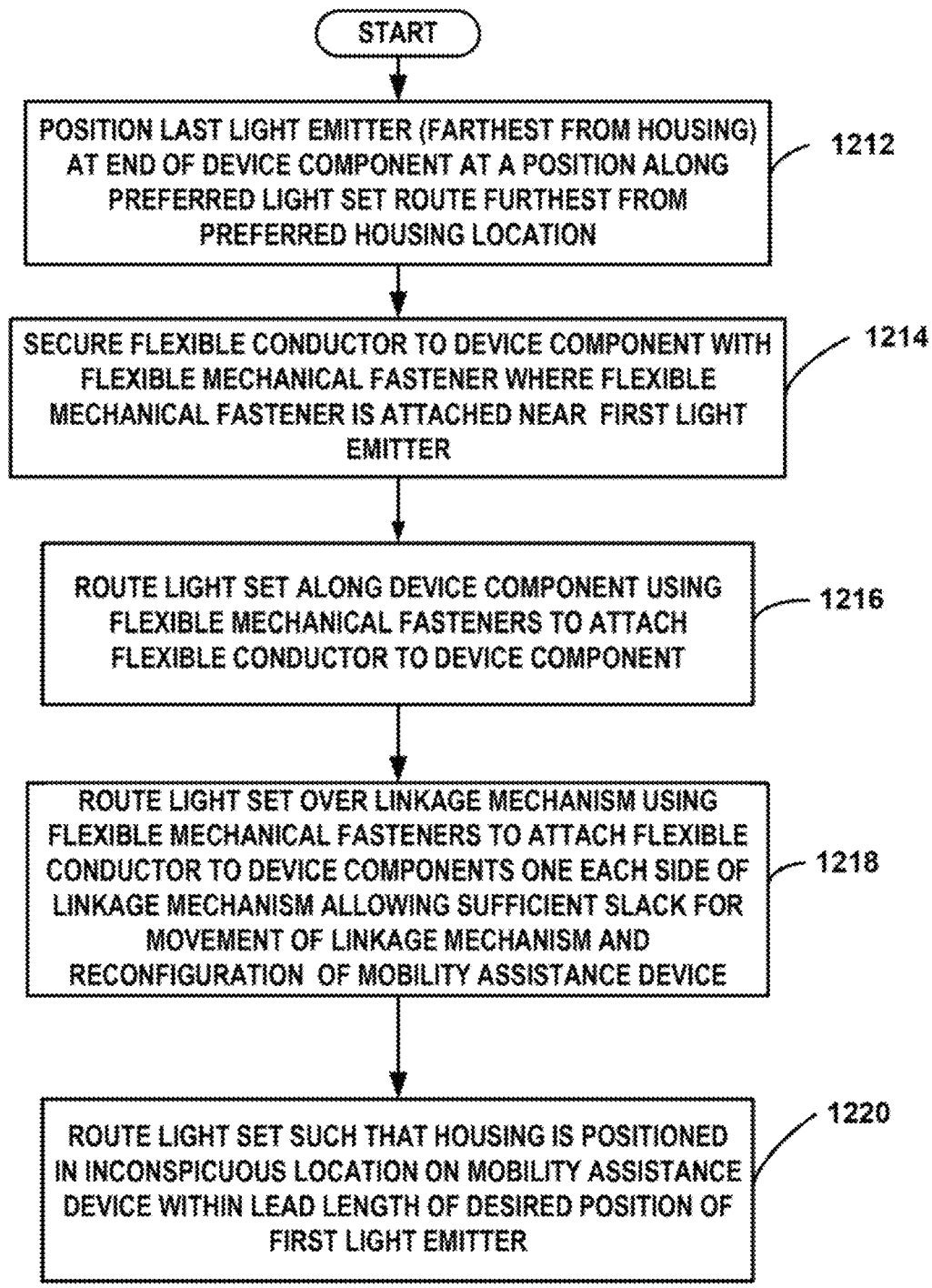
FIG. 12B is a flow chart of a second example of a method of attaching a light set to a mobility assistance device 10.

FIG. 12B is a flow chart of a second example of a method of attaching a light set to a mobility assistance device 10. The method can be used for installing a light set to any type of wheeled or non-wheeled mobility assistance device. The order of the steps may be changed in some circumstances and some steps may be omitted.

At step 1212, light emitter farthest from the housing along the length of the light set is positioned at the furthest point along the planned light set route along the features of the mobility device 10 and such that the end of the light set (i.e., light emitter farthest from the housing) occurs at the end of a device component. Preferably, the light emitter farthest from the housing along the length of the flexible conductor is positioned to avoid an appearance that the light set route ends in location other than an end of a device component. For example, the farthest light emitter should not be positioned in the middle of a frame member in most situations.

At step 1214, the flexible conductor is secured to a device component with a flexible mechanical fastener where the flexible mechanical fastener is attached near the farthest light emitter.

At step 1216, the light set is routed along the device component using flexible mechanical fasteners to attach flexible conductor to the device component. In one example, a flexible mechanical fastener is attached at every ten inches along straight sections of the light set route to attach the light set to the device 10. At each change in direction of the route, flexible mechanical fasteners are attached at both sides of the route direction change. For example, if the light set is attached along a frame of the device and the frame has a component that is angled or the route traverses a path along a first component to a second component that has an angle to the first component different than 180 degrees, flexible mechanical fasteners 124 are attached before and after the change in direction. In some situations, a route along straight section may have flexible mechanical fasteners spaced at a distance less than ten inches. For example, where the position and/or angle of the light emitters changes along the route, flexible mechanical fasteners may assist in properly positioning the light set.

At step 1218, the light set is routed over linkage mechanism using flexible mechanical fasteners to attach the flexible conductor to the device components on each side of the linkage mechanism allowing sufficient slack for movement of the linkage mechanism and reconfiguration of the mobility assistance device.

At step 1220, the light set is routed such that the housing 216 is positioned in an inconspicuous location on the mobility assistance device within a distance of the lead length from the desired position of the first light emitter. Examples of inconspicuous locations include floors and under the seat storage compartments of the mobility assistance device 10. Preferable locations for the housing 216 include locations that will not result in prolonged exposure of the housing to heat or moisture. In some situations, the housing 216 is attached to the frame of the device 10.

Therefore, for the example of FIG. 12B, the light set is attached to the mobility assistance device by positioning the last light emitter at an end of a device component at a point furthest along the anticipated light set route. The light set is attached to the device using flexible mechanical fasteners along the route that traverses the features of the mobility device 10 to an inconspicuous location for placing the housing. As discussed with reference to FIG. 12A, the light set is semi-permanently secured to the device such that children and pets are not able to easily remove the light set from the frame in some examples. As discussed above, permanent cable ties may be used as the flexible mechanical fasteners where the cables ties must be cut to remove the light set. Where releasable fasteners, such as reusable cable ties, are used, safety can be increased by using releasable fasteners that require a tool to remove the fastener. For the examples herein, the light set is positioned such that no component of the light set interferes with normal operation of the device. For example, in most situations, the light set should not interfere with rotation of wheels, maneuvering the device, reconfiguring the device, or transporting the device.

Figure 13:
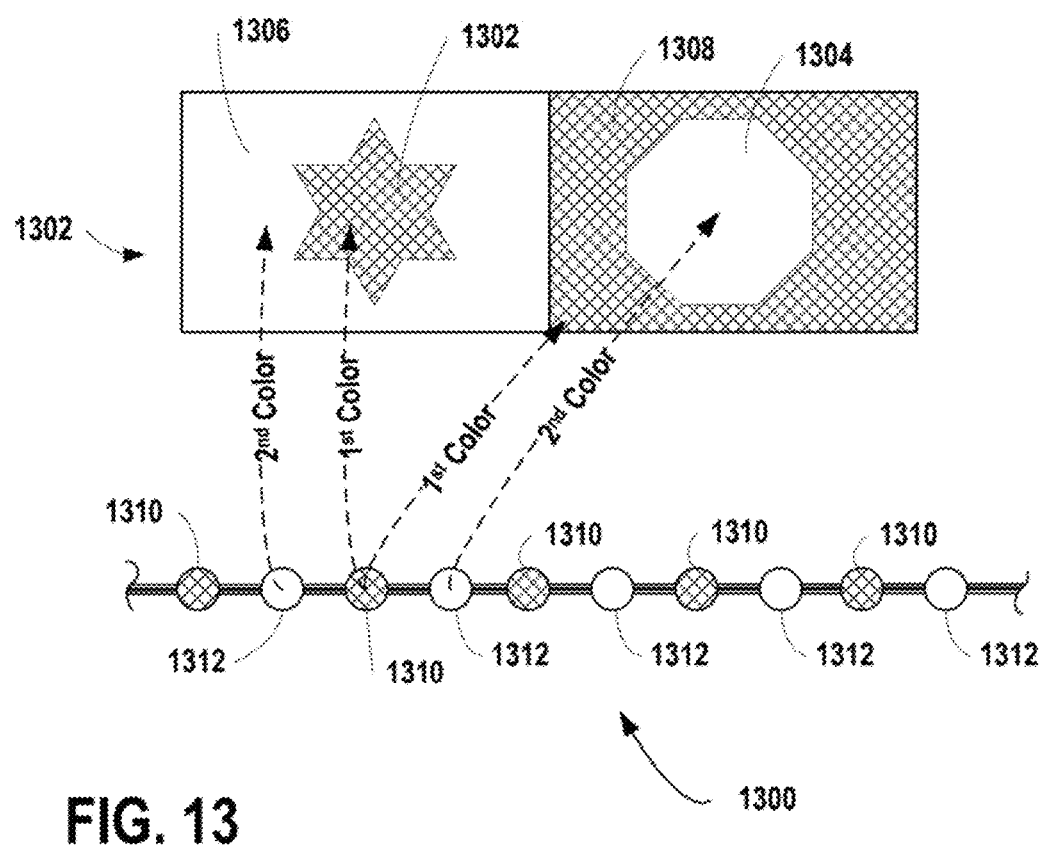
FIG. 13 is an illustration of a portion of a light set 1300 for an example where the colors of the light emitters correspond to colors of a logo 1302.

FIG. 13 is an illustration of a portion of a light set 1300 for an example where the colors of the light emitters correspond to colors of a logo 1302. In some situations, the colors of the light emitters of a light set are selected to represent a holiday, event, country, or a character. For example, the colors may correspond to the logo or theme of a specific sports team or theme park character or may correspond to the logo or theme of a sporting event, such as an Olympic event, World Cup event, or professional game or match. The user of the light set may wish to promote, show their support for, or indicate their admiration for a specific event, team, character, company, or holiday by selecting and/or installing light sets with specific colors on their personal mobility assistance device. Holidays and general events may be reflected by colors generally associated with the particular holiday. For example, Christmas may be associated with red and green, Valentine's Day may be associated with red and pink, St Patrick's Day may be associated with green or several shades of green, and Halloween may be associated with orange. Light emitters that emit light in these colors may be selected to represent the particular holiday or event. In some situations, however, the light emitter colors may be selected to correspond to specific colors of a logo, theme, or character.

FIG. 13 includes a generic representation of a logo 1302 that includes generic symbols 1304, 1306 having different colors. Numerous types of symbols, names, words, characters, patterns, and colors may be included in any particular logo. For the example of FIG. 13, the logo 1302 includes two symbols, where a first symbol 1304 having a first color is presented over a first background 1308 having a second color and a second symbol 1306 having the second color is presented over a second background 1310 having the first color. The light set 1300 includes a plurality of light emitters 1312 having the first color and a plurality of light emitters 1314 having the second color. Accordingly, the colors of the light emitters directly correspond to the colors of the logo 1302. Clearly, any number of light emit colors can be used and may include less colors than the logo that is represented. Preferably, a light set that represents a particular logo includes at least the colors of the logo that are unique or otherwise associated with the logo. In addition, the light emitter colors are preferably matched closely to the colors of the particular logo. As mentioned above, a particular logo may include any combination of letters, characters, patterns, and symbols and the symbols 1302, 1304 shown in FIG. 13 may be letters in some circumstances.

To further illustrate applications of some of the features and alternatives discussed above to a specific example, the following discussion is directed to the logos of Louisiana State University. At least one logo used by the University includes the capital letters of "LSU" in one of the authorized colors that include purple and gold, as well as some other secondary colors. Another variation of the logo includes the capital letters in purple outlined in gold. In other circumstances, the logo also includes an image of a tiger formed by at least the purple and gold. A light set for the example may include light emitters of two colors that best represent the logo and theme of the University. As a result, such a light set may include a first plurality of light emitters emitting purple light and a second set of light emitters emitting gold light where the emitted light is matched to the logo colors.

Numerous logos, themes, characters and events may be represented with light sets having emitters with different colors. Some examples of logos and themes include logos, colors, and themes of sports teams of colleges and universities, such as those in the National Collegiate Athletic Association (NCAA), and of professional leagues, such as the National Football League (NFL), National Hockey League (NHL), Major League Baseball (MLB), National Basketball Association (NBA), and North American Soccer League (NASL). Some examples of events that may be represented by a light set include the Olympic events and World Cup events. As mentioned above, countries may also be represented by a light set. The light emitters' colors may correspond to the colors of the country's flag, for example. Light sets may be associated with characters, such as cartoon characters or theme park characters.

In addition, light sets may include a set of colored light emitters that emit light in colors that reflect a particular generic theme. For example, various shades of pink, red, and white light emitters may provide a light set suitable for a baby stroller for a girl, while various shades of blue and white light emitters may provide a light set suitable for a baby stroller for a boy.

In some circumstances, a personal mobility device may be manufactured to include a light set. In one example, the light set is attached to the mobility device at the factory using the techniques discussed in the examples above. Accordingly, the light set may be attached with flexible mechanical fasteners along a route to the components of the mobility device after the device has otherwise been completed. In other examples, the mobility device may be designed to include clips or fastening devices that are part of, or permanently attached to, the components of the device allowing the light set to be attached to the device without additional mechanical fasteners. In another example, the light set may be implemented within the components of the device during manufacturing such that the light emitters are permanently attached or protrude through holes on the components. In such examples, the flexible conductor may be replaced by permanent non-conductors that are part of the components of the device. Such implementations may also include flexible conductors for traversing "break points" or linkage mechanisms in configurable devices. In some situations, a length of flexible conductor may simply provide a "jumper" from one side of the linkage mechanism to the other allowing the device to be collapsed, expanded or otherwise reconfigured. In other situations, the linkage mechanism may include contacts that provide an electrical connection across the linkage mechanism in operable configurations of the device. Where the linkage mechanism has two positions such as expanded, operable configuration and a collapsed, transportation configuration, the contacts may only provide an electrical connection across the linkage mechanism when the device is in the operable configuration. Where an adjustable/reconfigurable device has an adjustment linkage mechanism that allows for serval operable positions of the linkage mechanism, several contacts may provide for electrical connections in each of the operable positions. Where a section of flexible conductor traverses a linkage mechanism, the flexible conductor may be within the component of the device in some cases.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A personal mobility assistance device comprising:
    a frame having a plurality of openings and comprising, a linkage mechanism, a first rigid frame component, and a second rigid frame component connected to the first rigid frame component by the linkage mechanism and moveable relative to the first rigid frame component, the first rigid frame component having a first portion of the plurality of openings, the second rigid frame component having a second portion of the plurality of openings, the second rigid component movable relative to the first component through the linkage mechanism such that the apparatus is capable of being configured in a plurality of apparatus configurations comprising at least one operable device configuration for use of the personal mobility device;
    a light set comprising:
        a housing configured to at least partially enclose a battery;
        a conductor comprising a first component conductor portion within the first rigid component and a second component conductor portion within the second rigid component; and
        a plurality of light emitters electrically connected to the conductor, the light set non-detachably attached to the frame such that each of the plurality of light emitters is non-detachably mounted in one of the plurality of openings, the conductor configured to form, when the light set is in an active on state, an electrical connection between the battery and the plurality of light emitters to activate the plurality of light emitters to emit light to outline features of the frame such that a shape of the frame is discernable by observing a relative position of each of the plurality of light emitters to at least one other light emitter of the plurality of light emitters, the features including at least two curved portions of the shape, at least some of the plurality of light emitters positioned along the curved portions; and
        a conductor connection mechanism within the linkage mechanism, the conductor connection mechanism comprising a plurality of contacts, the second component conductor portion electrically connected to the first conductor portion by the conductor connection mechanism through the plurality of contacts when the device is in the at least one operable device configuration.

2. The personal mobility assistance device of claim 1, wherein the plurality of light emitters protrude through the openings.

3. The personal mobility assistance device of claim 1, wherein each of the plurality of light emitters is configured to generate a light dot when activated, the light set attached to the personal mobility assistance device to outline features of the frame such that the shape of the frame is discernable by observing a relative position of each light dot generated by each of the plurality of light emitters to at least one other light dot generated by the another light emitter of the plurality of light emitters.

4. The personal mobility assistance device of claim 2, wherein the spacing between each pair of consecutive light emitters is less than four inches.

5. The personal mobility assistance device of claim 4, wherein the spacing between each pair of consecutive light emitters is less than one inch.

6. The personal mobility assistance device of claim 1, wherein at least one of the plurality of apparatus configurations is a collapsed transportation configuration, the first component conductor portion electrically disconnected from the second component conductor portion when the apparatus is in the collapsed transportation configuration.

7. The personal mobility assistance device of claim 1, wherein at least one component of the frame forms at least one portion of the conductor.

8. A personal mobility assistance device comprising:
- a frame comprising a plurality of components, each component being rigid and having a plurality of openings, the plurality of components comprising a first component and a second component movable relative to the first component through a linkage mechanism such that the second component is movable to at last two positions relative to the first component allowing the device to be configured in a plurality of device configurations, the plurality of device configurations comprising an operable device configuration for use of the personal mobility device and a collapsed transportation configuration;
- a housing configured to at least partially enclose a battery;
- a conductor having a first component conductor portion enclosed within the first component and a second component conductor portion enclosed in the second component;
- a conductor connection mechanism within the linkage mechanism, the conductor connection mechanism comprising a plurality of contacts, the second component conductor portion electrically connected to the first conductor portion by the conductor connection mechanism through the plurality of contacts when the device is in the operable device configuration, the second component conductor portion electrically disconnected from the first conductor portion when the device is in the collapsed transportation configuration; and
- a plurality of light emitters electrically connected to the conductor, each of the light emitters non-detachably mounted within an opening in the frame, the conductor configured to form, when the light set is in an active on state, an electrical connection between the battery and the plurality of light emitters to activate the plurality of light emitters to emit light to outline features of the frame such that a shape of the frame is discernable by observing a relative position of each of the plurality of light emitters to at least one other light emitter of the plurality of light emitters.

9. The device of claim 7, wherein at least one component of the frame forms at least one portion of the conductor.

10. The personal mobility assistance device of claim 7, wherein the plurality of light emitters protrude through the openings.

11. The personal mobility assistance device of claim 8, wherein each of the plurality of light emitters is configured to generate a light dot when activated, the light set attached to the personal mobility assistance device to outline features of the frame such that the shape of the frame is discernable by observing a relative position of each light dot generated by each of the plurality of light emitters to at least one other light dot generated by the another light emitter of the plurality of light emitters.

12. The personal mobility assistance device of claim 8, wherein the spacing between each pair of consecutive light emitters is less than four inches.

13. The personal mobility assistance device of claim 12, wherein the spacing between each pair of consecutive light emitters is less than one inch.

* * * * *